(12) United States Patent
Sexton et al.

(10) Patent No.: US 8,069,933 B2
(45) Date of Patent: *Dec. 6, 2011

(54) BEARING ASSEMBLIES, AND BEARING APPARATUSES AND MOTOR ASSEMBLIES USING SAME

(75) Inventors: Timothy N. Sexton, Genola, UT (US); Craig H. Cooley, Saratoga Springs, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/964,208

(22) Filed: Dec. 9, 2010

(65) Prior Publication Data

US 2011/0174547 A1  Jul. 21, 2011

Related U.S. Application Data

(63) Continuation of application No. 11/879,867, filed on Jul. 18, 2007, now Pat. No. 7,870,913.

(51) Int. Cl.
*E21B 4/02* (2006.01)
(52) U.S. Cl. ........... 175/107; 175/104; 364/215; 364/95
(58) Field of Classification Search .................. 175/107, 175/104, 92; 384/215, 95
See application file for complete search history.

(56) References Cited

U.S. PATENT DOCUMENTS

| | | | |
|---|---|---|---|
| 3,132,908 A | 5/1964 | Grotzinger |
| 3,311,431 A | 3/1967 | Hilliard |
| 3,371,970 A | 3/1968 | Beerli |
| 3,542,441 A | 11/1970 | Nixon |
| 3,625,327 A | 12/1971 | Birdsey et al. |
| 3,745,623 A | 7/1973 | Wentorf, Jr. et al. |
| 3,858,668 A | 1/1975 | Bell |
| 3,858,669 A | 1/1975 | Jeter |
| 4,129,343 A | 12/1978 | Janssen |
| 4,226,485 A | 10/1980 | Pruvot |
| 4,240,683 A | 12/1980 | Crase |
| 4,256,190 A | 3/1981 | Bodine |
| 4,268,094 A | 5/1981 | Greene |

(Continued)

FOREIGN PATENT DOCUMENTS

DE      4226986      2/1994

(Continued)

OTHER PUBLICATIONS

U.S. Appl. No. 11/879,867, filed Jul. 18, 2007, Sexton et al.

(Continued)

*Primary Examiner* — David Andrews
(74) *Attorney, Agent, or Firm* — Workman Nydegger

(57) ABSTRACT

Various embodiments of the present invention relate to bearing assemblies configured to accommodate non-uniform loading and misalignment with an adjacent bearing assembly. In one embodiment of the present invention, a bearing assembly for use in a subterranean drilling system is disclosed. The bearing assembly includes a support ring and a retention ring attached to the support ring, with the retention ring including a plurality of through holes. The bearing assembly includes a plurality of bearing elements each of which includes a superhard bearing surface. Each of the bearing elements is positioned in and extends from a corresponding through hole of the plurality of through holes. At least a number of the bearing elements are configured to restrict displacement through the corresponding through hole and away from the support ring. Further embodiments of the present invention are directed to a thrust-bearing apparatus, a radial bearing apparatus, and a downhole motor that incorporates disclosed thrust-bearing and radial bearing assemblies.

21 Claims, 15 Drawing Sheets

U.S. PATENT DOCUMENTS

| | | | |
|---|---|---|---|
| 4,345,798 | A | 8/1982 | Cortes |
| 4,386,666 | A | 6/1983 | Crase et al. |
| 4,410,054 | A | 10/1983 | Nagel et al. |
| 4,468,138 | A | 8/1984 | Nagel |
| 4,506,998 | A | 3/1985 | Showalter |
| 4,515,486 | A | 5/1985 | Ide |
| 4,560,014 | A | 12/1985 | Geczy |
| 4,604,106 | A | 8/1986 | Hall et al. |
| 4,620,601 | A | 11/1986 | Nagel |
| 4,629,373 | A | 12/1986 | Hall |
| 4,639,146 | A | 1/1987 | Yoshioka et al. |
| 4,657,090 | A | 4/1987 | Geczy |
| 4,662,348 | A | 5/1987 | Hall et al. |
| 4,708,496 | A | 11/1987 | McPherson |
| 4,710,036 | A | 12/1987 | Geczy |
| 4,720,199 | A | 1/1988 | Geczy et al. |
| 4,729,440 | A | 3/1988 | Hall |
| 4,732,364 | A | 3/1988 | Seger et al. |
| 4,738,322 | A | 4/1988 | Hall et al. |
| 4,756,631 | A | 7/1988 | Jones |
| 4,764,036 | A | 8/1988 | McPherson |
| 4,802,539 | A | 2/1989 | Hall et al. |
| 4,818,124 | A | 4/1989 | Brandenstein et al. |
| 4,997,292 | A | 3/1991 | Klimkovsky et al. |
| 5,092,687 | A | 3/1992 | Hall |
| 5,125,754 | A | 6/1992 | Ide |
| 5,253,939 | A | 10/1993 | Hall |
| 5,364,192 | A | 11/1994 | Damm et al. |
| 5,368,398 | A | 11/1994 | Damm et al. |
| 5,441,347 | A | 8/1995 | Ide |
| 5,480,233 | A | 1/1996 | Cunningham |
| 5,498,081 | A | 3/1996 | Dennis et al. |
| 5,735,668 | A | 4/1998 | Klein |
| 5,743,654 | A | 4/1998 | Ide et al. |
| 5,795,077 | A | 8/1998 | Gozdawa |
| 5,876,125 | A | 3/1999 | Wyndorps et al. |
| 6,000,851 | A | 12/1999 | Cohen et al. |
| 6,091,175 | A | 7/2000 | Kinsinger |
| 6,422,754 | B1 | 7/2002 | Dong et al. |
| 6,424,066 | B1 | 7/2002 | Watson et al. |
| 6,517,246 | B2 | 2/2003 | Blakley |
| 6,793,681 | B1 | 9/2004 | Pope et al. |
| 7,060,641 | B2 | 6/2006 | Qian et al. |
| 7,163,368 | B2 | 1/2007 | Ide et al. |
| 7,306,059 | B2 | 12/2007 | Ide |
| 7,608,333 | B2 | 10/2009 | Eyre |
| 7,703,982 | B2 | 4/2010 | Cooley |
| 7,726,420 | B2 | 6/2010 | Shen et al. |
| 7,798,257 | B2 | 9/2010 | Shen et al. |
| 2004/0241021 | A1 | 12/2004 | Ide et al. |
| 2005/0247492 | A1 | 11/2005 | Shen et al. |
| 2006/0278439 | A1 | 12/2006 | Ide |
| 2007/0046119 | A1 | 3/2007 | Cooley |
| 2007/0046120 | A1 | 3/2007 | Cooley et al. |
| 2007/0110561 | A1 | 5/2007 | Ide et al. |
| 2008/0115976 | A1 | 5/2008 | Ide |
| 2010/0226759 | A1 | 9/2010 | Cooley et al. |

FOREIGN PATENT DOCUMENTS

| | | |
|---|---|---|
| EP | 0543461 | 5/1993 |
| GB | 2057069 | 3/1981 |
| WO | WO 80/01939 | 9/1980 |
| WO | WO 2007/025117 | 3/2007 |

OTHER PUBLICATIONS

U.S. Appl. No. 12/761,535, filed Apr. 16, 2010, Scott et al.
U.S. Appl. No. 11/465,010, filed Aug. 16, 2006, Cooley et al.
U.S. Appl. No. 12/722,289, filed Mar. 11, 2010, Cooley et al.
International Search Report and Written Opinion from PCT/US2006/033201 dated Dec. 19, 2006.
U.S. Appl. No. 11/879,867, mailed Aug. 27, 2009, Restriction Requirement.
U.S. Appl. No. 11/879,867, mailed Dec. 1, 2009, Office Action.
U.S. Appl. No. 11/879,867, mailed May 18, 2010, Office Action.
U.S. Appl. No. 11/879,867, mailed Sep. 2, 2010, Notice of Allowance.
U.S. Appl. No. 11/879,867, mailed Nov. 26, 2010, Notice of Allowance.
U.S. Appl. No. 11/212,232, mailed Apr. 13, 2007, Restriction Requirement.
U.S. Appl. No. 11/212,232, mailed Jul. 10, 2007, Office Action.
U.S. Appl. No. 11/212,232, mailed Jan. 10, 2008, Office Action.
U.S. Appl. No. 11/212,232, mailed Jun. 17, 2008, Office Action.
U.S. Appl. No. 11/212,232, mailed Dec. 4, 2008, Office Action.
U.S. Appl. No. 11/212,232, mailed Mar. 16, 2009, Office Action.
U.S. Appl. No. 11/212,232, mailed Jul. 31, 2009, Office Action.
U.S. Appl. No. 11/212,232, mailed Dec. 11, 2009, Notice of Allowance.
U.S. Appl. No. 11/212,232, mailed Apr. 7, 2010, Issue Notification.
U.S. Appl. No. 11/465,010, mailed Dec. 23, 2008, Office Action.
U.S. Appl. No. 11/465,010, mailed Oct. 14, 2009, Office Action.
U.S. Appl. No. 11/465,010, mailed Mar. 8, 2010, Office Action.
U.S. Appl. No. 11/465,010, mailed Aug. 11, 2010, Office Action.
U.S. Appl. No. 12/722,289, mailed Jul. 27, 2010, Office Action.
U.S. Appl. No. 11/465,010, mailed Jun. 15, 2011, Office Action.
U.S. Appl. No. 11/879,867, mailed Dec. 28, 2010, Issue Notification.
U.S. Appl. No. 12/722,289, mailed Jan. 14, 2011, Notice of Allowance.
U.S. Appl. No. 12/722,289, mailed Mar. 4, 2011, Notice of Allowance.

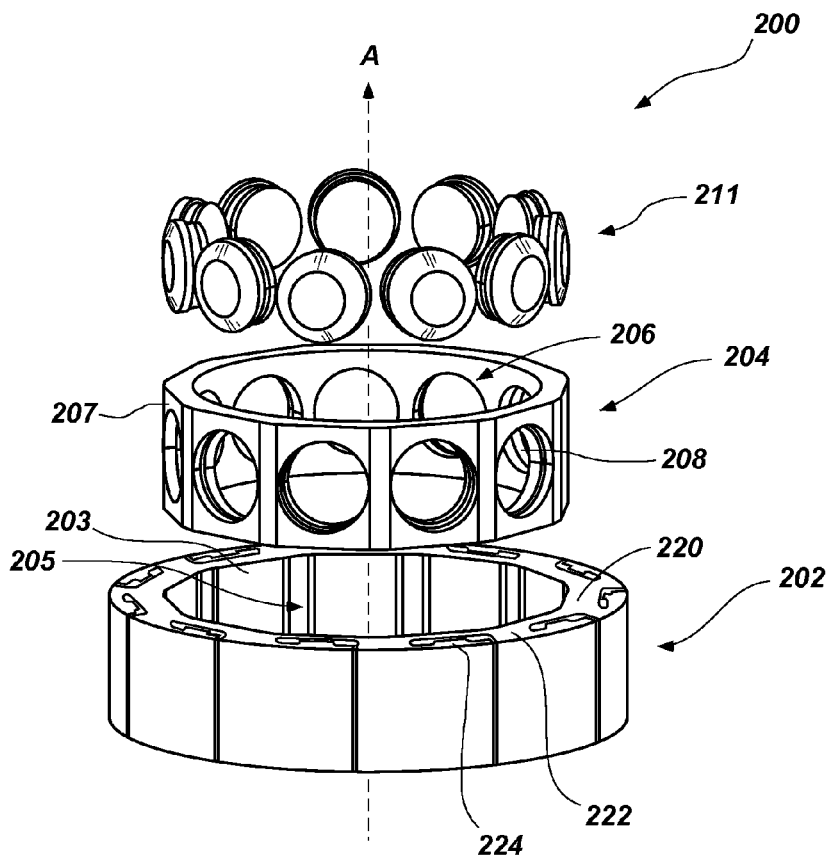
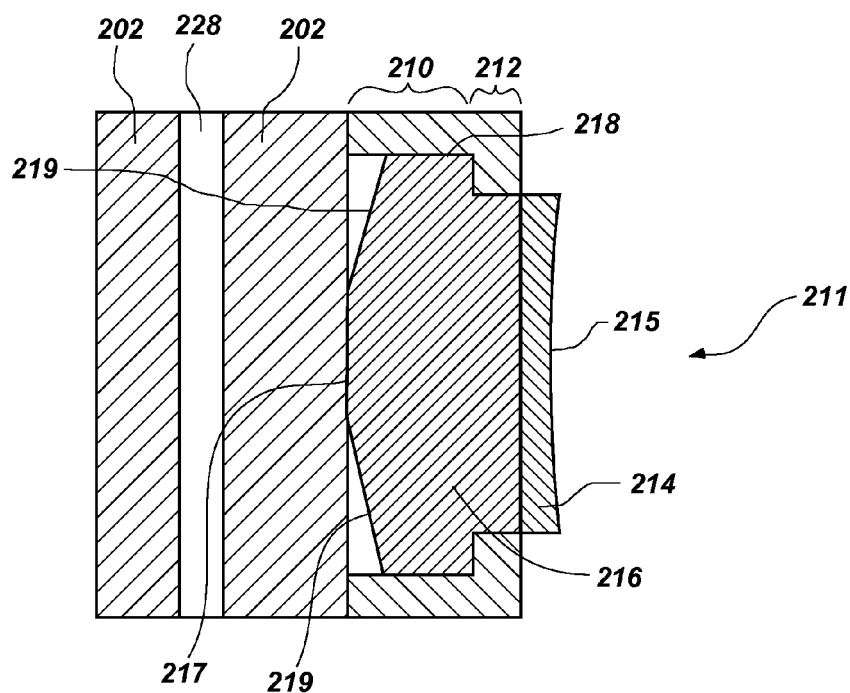

BEARING ASSEMBLIES, AND BEARING APPARATUSES AND MOTOR ASSEMBLIES USING SAME

CROSS-REFERENCE TO RELATED APPLICATIONS

This application is a continuation of U.S. application Ser. No. 11/879,867, filed on 18 Jul. 2007, now U.S. Pat. No. 7,870,913 issued on 18 Jan. 2011, the disclosure of which is incorporated herein, in its entirety, by this reference.

TECHNICAL FIELD

Embodiments of present invention relate to a bearing assembly configured to accommodate non-uniform loading and/or misalignment, and a bearing apparatus employing such a bearing assembly. Embodiments of the present invention also relate to a bearing assembly in which bearing elements thereof may be mounted to a support structure without using a brazing process.

BACKGROUND

Subterranean drilling systems that employ downhole drilling motors are commonly used for drilling boreholes in the earth for oil and gas exploration. FIG. 1 is a schematic isometric, partial, cut-away view of a prior art subterranean drilling system 100. The subterranean drilling system 100 includes a housing 102 enclosing a downhole drilling motor 104 (i.e., a motor, turbine, or any other device capable of rotating a shaft) that is operably connected to an output shaft 106. A thrust-bearing apparatus 108 is also operably coupled to the downhole drilling motor 104. A rotary drill bit 112 configured to engage a subterranean formation and drill a borehole is connected to the output shaft 106. The rotary drill bit 112 is shown as a "roller cone" type bit including a plurality of roller cones 114. However, other types of rotary drill bits, such as so called "fixed cutter" drill bits are also commonly used. As the borehole is drilled, pipe sections may be connected to the subterranean drilling system 100 to form a drill string capable of progressively drilling the borehole to a greater depth within the earth.

The thrust-bearing apparatus 108 includes a stator 116 that does not rotate and a rotor 118 that is attached to the output shaft 106 and rotates with the output shaft 106. The stator 116 and rotor 118 each include a plurality of bearing elements 120 that may be fabricated from polycrystalline-diamond compacts that provide diamond bearing surfaces that bear against each other during use.

In operation, high pressure drilling fluid is circulated through the drill string and power section (not shown) of the downhole drilling motor 104, usually prior to the rotary drill bit 112 engaging the bottom of the borehole, to generate torque and rotate the output shaft 106 and the rotary drill bit 112 attached to the output shaft 106. Unless rotated from above by the drill rig rotary, the housing 102 of the downhole drilling motor 104 remains stationary as the output shaft 106 rotates the rotary drill bit 112. When the rotary drill bit 112 engages the bottom of the borehole, a thrust load is generated, which is commonly referred to as "on-bottom thrust" that tends to compress the thrust-bearing apparatus 108. The on-bottom thrust is carried, at least in part, by the thrust-bearing apparatus 108. Fluid flow through the power section may cause what is commonly referred to as "off-bottom thrust," which is carried, at least in part, by another thrust-bearing apparatus that is not illustrated. The drilling fluid used to generate the torque for rotating the rotary drill bit 112 exits openings formed in the rotary drill bit 112 and returns to the surface, carrying the cuttings of the subterranean formation through an annular space between the drilled borehole and the subterranean drilling system 100. Typically, a portion of the drilling fluid is diverted by the downhole drilling motor 104 to cool and lubricate both the thrust-bearing apparatus 108 and the other thrust-bearing apparatus. Lateral loads may also be applied to the subterranean drilling system 100 during drilling of the borehole.

Both the off-bottom and on-bottom thrust carried by the thrust-bearing apparatuses can be extremely large. Accordingly, the operational lifetime of the thrust-bearing apparatuses often determines the useful life for the subterranean drilling system 100. For example, during operation, bending and/or side loading of the subterranean drilling system 100 can cause some of the bearing elements 120 of the thrust-bearing apparatus 108 to experience higher than desired stresses and/or temperatures. A slight angular misalignment between the stator 116 and rotor 118 of the thrust-bearing apparatus 108 due to such bending and/or side loading may cause certain bearing elements 120 of the thrust-bearing apparatus 108 to partially contact or even fail to contact each other during operation, causing other bearing elements to contact each other at higher than desired stresses. The bearing elements 120 of the thrust-bearing apparatus 108 that remain in contact with each other may experience sufficiently large stresses and sufficiently high temperatures during drilling to damage or even fracture and, ultimately, may cause premature failure of the subterranean drilling system 100.

Therefore, manufacturers and users of subterranean drilling systems continue to seek improved thrust-bearing apparatuses and radial bearing apparatuses that can accommodate such loading and/or misalignment between bearing components.

SUMMARY

Various aspects of the present invention relate to bearing assemblies configured to accommodate non-uniform loading and/or misalignment with another bearing assembly. Such bearing assemblies may be employed in bearing apparatuses for use in downhole motors of a subterranean drilling system or other mechanical systems. In one aspect of the present invention, a bearing assembly comprises a compliance ring including a plurality of beams. Each of the beams is circumferentially spaced apart from each other. The bearing assembly further comprises a plurality of bearing elements, with each of the bearing elements positioned adjacent to a corresponding beam of the plurality of beams. According to various embodiments of the present invention, the bearing assembly may be configured as a thrust-bearing assembly or a radial bearing assembly.

In another aspect of the present invention, a bearing assembly includes a support ring and a retention ring assembled with the support ring. The retention ring includes a plurality of through holes formed therein. A plurality of bearing elements, each of which includes a bearing portion and a base portion, are assembled with the retention ring. Each of the bearing elements is positioned generally within a corresponding through hole of the plurality of through holes. A plurality of biasing elements are positioned between the support ring and the retention ring, with each of the biasing elements positioned between the base portion of a corresponding bearing element of the plurality of bearing elements and the support ring. According to various embodiments of the present invention, the bearing assembly may be configured as a thrust-bearing assembly or a radial bearing assembly.

An additional aspect of the present invention is directed to a bearing assembly in which bearing elements thereof may be secured to a support without using a brazing process. The bearing assembly includes a support ring and a retention ring assembled with the support ring. The retention ring including a plurality of through holes formed therein. A plurality of bearing elements are assembled with the retention ring, with each of bearing elements positioned generally within a corresponding through hole of the plurality of through holes. Each of the bearing elements includes a bearing portion and a base portion that comprises a shoulder. According to various embodiments of the present invention, the bearing assembly may also be configured as a thrust-bearing assembly or a radial bearing assembly.

Further aspects of the present invention are directed to a thrust-bearing apparatus, a radial bearing apparatus, and a downhole motor that may utilize any of the disclosed thrust-bearing assemblies and radial bearing assemblies.

In yet another aspect of the present invention, a method of assembling a bearing assembly is disclosed. A retention ring is provided with a plurality of through holes formed therein. Each of the through holes includes a first portion exhibiting a first lateral dimension and a second portion exhibiting a second lateral dimension less than the first lateral dimension. A bearing element is positioned generally within each of the through holes of the retention ring. Each of the bearing elements comprises a bearing portion and a shoulder portion. The shoulder of each the bearing elements restricts displacement through a corresponding through hole of the plurality of through holes in a first direction. A support ring is assembled with the retention ring to restrict displacement of each of the bearing elements in a second direction that is generally opposite to the first direction.

BRIEF DESCRIPTION OF THE DRAWINGS

The drawings illustrate various embodiments of the present invention, wherein like reference numerals refer to like elements or features in different views or embodiments shown in the drawings.

FIG. 2B is an exploded, isometric view of the radial bearing assembly shown in FIG. 2A.

FIG. 2C is an enlarged, cross-sectional view of the radial bearing assembly shown in FIG. 2A taken along line 2C-2C illustrating one of the bearing elements and portions of the compliance ring and retention ring in more detail.

DETAILED DESCRIPTION

Various embodiments of the present invention relate to thrust-bearing assemblies and radial bearing assemblies configured to accommodate non-uniform loading and/or angular misalignment with another bearing assembly, and bearing apparatuses employing such bearing assemblies for use in downhole motors of a subterranean drilling system or other mechanical systems. Additional embodiments of the present invention relate to thrust-bearing assemblies and radial bearing assemblies in which bearing elements thereof may be mounted to a support without brazing.

Figure 1:
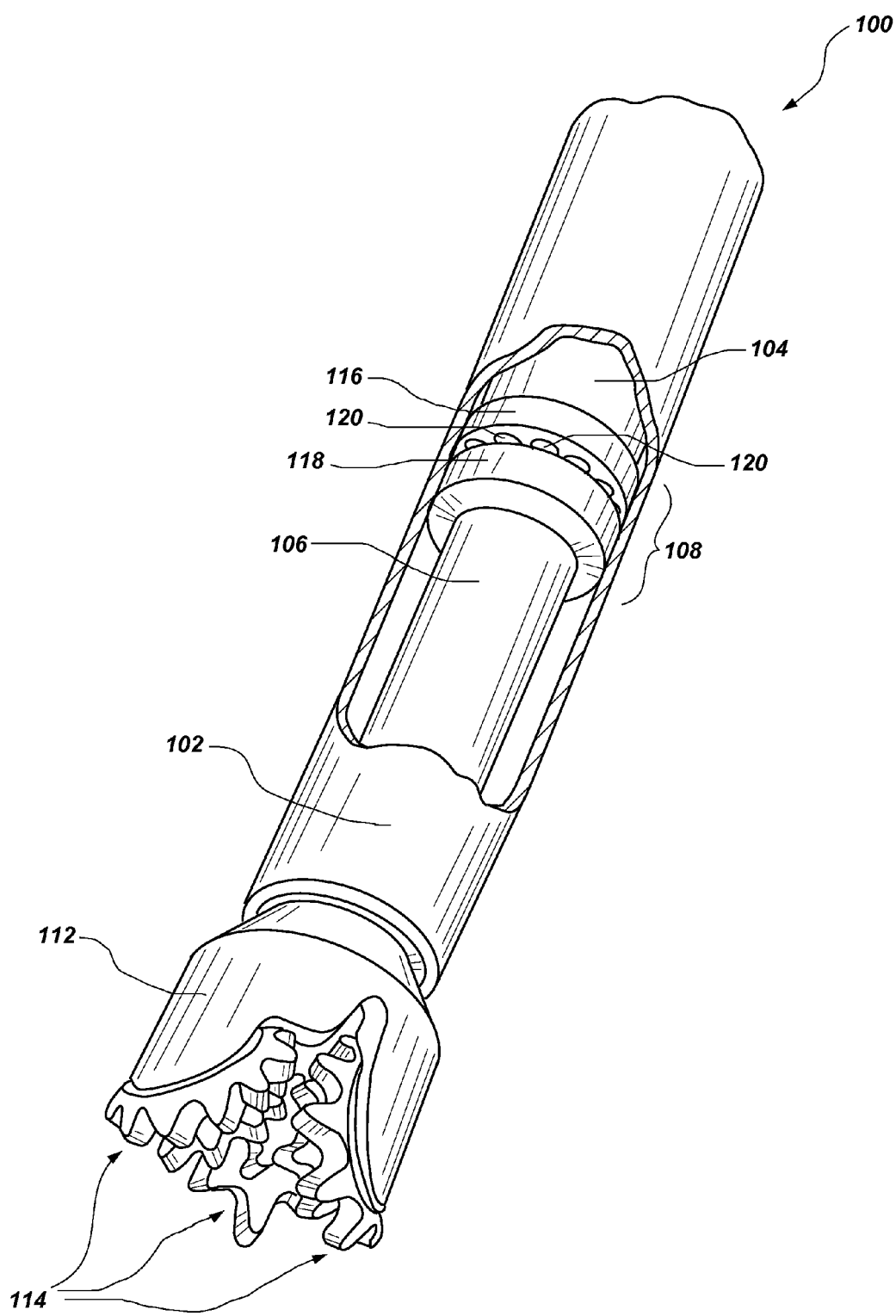
FIG. 1 is a schematic isometric, partial, cut-away view of a prior art subterranean drilling system including a thrust-bearing apparatus.
Figure 2A:
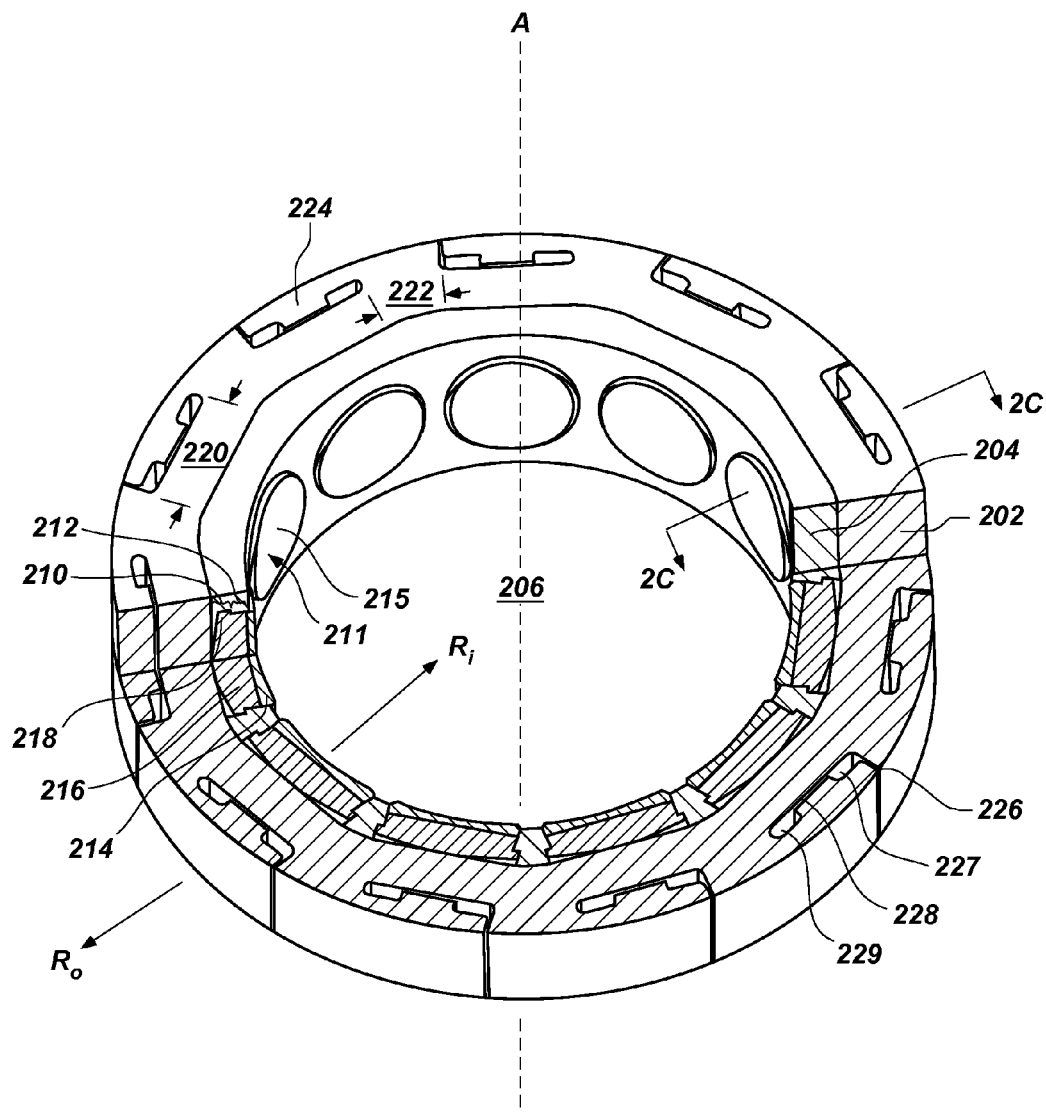
FIG. 2A is an isometric, partial, cut-away view of a radial bearing assembly comprising a compliance ring including a plurality of beams according to one embodiment of the present invention.

FIGS. 2A through 2D show a radial bearing assembly 200 according to one embodiment of the present invention. Referring to FIGS. 2A and 2B, the radial bearing assembly 200 comprises an outer, compliance ring 202 extending about an axis A. The compliance ring 202 includes an inner, peripheral surface 203 (FIG. 2B) defining an aperture 205 (FIG. 2B). The aperture 205 (FIG. 2B) of the compliance ring 202 is shaped to receive a retention ring 204 that also extends about the axis A. The retention ring 204 includes an outer, peripheral surface 207 (FIG. 2B) shaped to correspond to the inner, peripheral surface 203 (FIG. 2B) of the compliance ring 202. The retention ring 204 defines an aperture 206 configured to receive, for example, another radial bearing assembly that is coupled to a shaft of a downhole motor or other apparatus. The retention ring 204 may include a plurality of counterbore through holes 208 (FIG. 2B) that extend radially through the retention ring 204. The compliance ring 202, retention ring 204, or both may comprise a metallic material, such as steel, or may comprise a more wear resistant material, such as cemented tungsten carbide, silicon carbide, or another more wear resistant material.

As best shown in FIG. 2C, each of the through holes 208 (FIG. 2B) includes large-diameter hole portion 210 with a first diameter and a small-diameter hole portion 212 with a second diameter less than the first diameter. The radial bearing assembly 200 further includes a plurality of bearing elements 211, each of which is positioned generally within a corresponding through hole 208 of the retention ring 204 from the side of the retention ring 204 including the outer, peripheral surface 207 (FIG. 2B). Each of the bearing elements 211 includes a bearing portion 214 with a bearing surface 215, and a base portion 216 that comprises a shoulder 218. For example, the shoulder 218 being integral with the base portion 216 as illustrated. Each of the bearing surfaces 215 may be concave. In one embodiment of the present invention, all of the bearing surfaces 215 may be positioned on a common, imaginary, generally cylindrical surface. The base portion 216 of each bearing element 211 includes a non-planar back surface. For example, as illustrated in the bearing element 211 shown in FIG. 2C, the base portion 216 includes a contact surface 217 that may abut the compliance ring 202 and a circumferentially extending chamfer 219.

Turning again to FIGS. 2A and 2B, after positioning each of the bearing elements 211 generally within a corresponding through hole 208, the retention ring 204 is inserted into the aperture 205 (FIG. 2B) defined by the compliance ring 202, and the compliance ring 202 and the retention ring 204 are secured together. The compliance ring 202 and the retention ring 204 may be secured together by press-fitting, shrink-fitting, using a number of fasteners, by brazing, by welding, or any suitable technique. With reference again to FIG. 2C, when the compliance ring 202 and the retention ring 204 are assembled together, the shoulder 218 restricts attempted inward radial displacement of a bearing element 211 through a corresponding through hole 208 due to physical interference of the shoulder 218 with a portion of the retention ring 204 defining the large-diameter hole portion 210 of the through hole 206. Thus, the bearing elements 211 may be secured within the radial bearing assembly 200 without having to braze each of the bearing elements 211 to a support ring or other structure using a brazing process, which can cause degradation of bearing elements 211 if the bearing elements 211 include a polycrystalline-diamond table or other temperature-sensitive superabrasive material.

As shown in FIGS. 2A and 2B, the compliance ring 202 also includes a plurality of beams 220 that are circumferentially spaced apart from each other about the axis A. As will be discussed in more detail below, the beams 220 are constructed to provide a selected compliance to each of the bearing elements 211. Accordingly, as used herein, the term "beam" refers to a portion of a compliance ring associated with a bearing element that is configured to deform a desired amount responsive to loading of the bearing element. Additionally, each of the beams 220 may be independently biased by an outward radial force applied to a corresponding bearing element 211. As best shown in FIG. 2A, an interconnecting portion 222 extends circumferentially between adjacent beams 220. The interconnecting portions 222 exhibit a relatively lower compliance (i.e., greater stiffness) than that of the beams 220. When the compliance ring 202 and the retention ring 204 are assembled together, each of the bearing elements 211 is positioned radially adjacent to a corresponding beam 220 so that during operation each of the beams 220 provides a selected compliance to each of the bearing elements 211. More particularly, the base portion 216 of each of the bearing elements 211 may be positioned adjacent to a corresponding beam 220 from the interior of the compliance ring 202 and may abut or bear against a corresponding beam 220 during use.

Figure 2D:
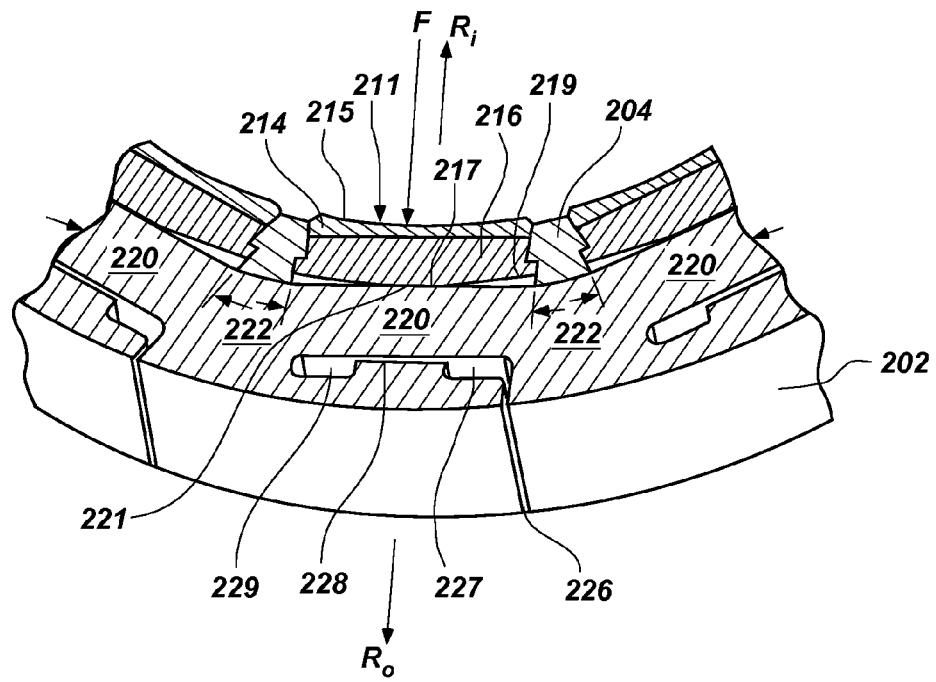
FIG. 2D is an enlarged isometric cross-sectional view of the radial bearing assembly shown in FIG. 2C illustrating one of the bearing elements in more detail.

As illustrated in FIG. 2D, in operation, when one or more of the bearing elements 211 are loaded to a greater extent than other bearing elements 211, the bearing elements 211 loaded to a greater extent may bias or deform corresponding beams 220 radially outward in a direction $R_o$ to distribute the loading to other ones of the bearing elements 211. For example, a force F in a radially outward direction may load a bearing surface 215 of a bearing element 211 to cause the contact surface 217 of the base portion 216 thereof to bear against a radially adjacent beam 220 and deform the beam 220 in the direction $R_o$. The contact surface 217 may be positioned to be biased against the beam 220, responsive to the force F, at a midpoint 221 thereof where the beam 220 is most compliant or along a portion of the beam 220 that includes the midpoint 221. The deflection of the beam 220 also allows displacement of a corresponding bearing surface 215 radially outward in the direction $R_o$. The deflection of the beam 220 is predominately elastic deformation and, thus, the bearing surface 215 is displaced in a radially inward in a direction $R_i$ to its neutral position (i.e., unloaded position), shown in FIGS. 2A, 2B, and 2D, upon removal of the radially outward force F applied to the bearing surface 215. For example, a representative magnitude for the maximum deflection of a beam 220 may be about 0.0010 inches. Moreover, the ability of the beams 220 to deform responsive to application of a force to the bearing elements 211 may allow the bearing elements 211 to better absorb dynamic loads without fracturing.

As shown in FIGS. 2A and 2D, in the illustrated embodiment, the compliance ring 202 further includes a plurality of stopper portions 224, each of which is positioned radially outward from a corresponding beam 220. For example, the stopper portions 224 and the beams 220 may be formed by machining slots 226-229 from a piece of metallic material. The stopper portions 224 may function to restrict outward radial displacement of the beams 220 beyond the slot 228. In operation, one or more of the bearing elements 211 may bias or deform a corresponding beam 220 radially outward until the beam 220 being biased contacts a corresponding stopper portion 224 that restricts or otherwise limits additional outward radial displacement of the beam 220 being biased. In other embodiments of the present invention, the stopper portions 224 may be omitted.

Figure 2E:
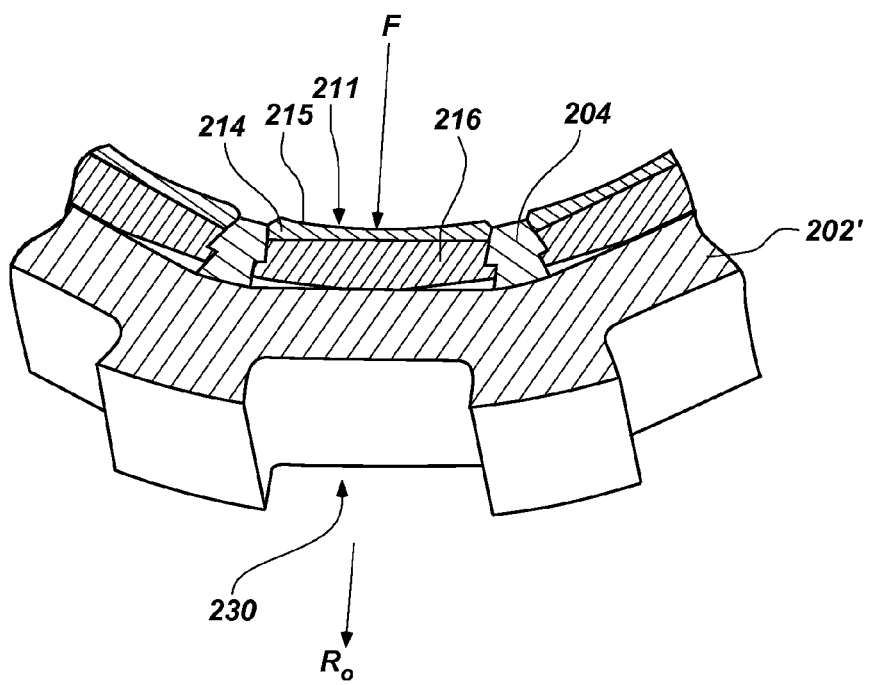
FIG. 2E is an enlarged, isometric cross-sectional view of a radial bearing assembly illustrating a compliance ring configured in accordance with another embodiment of the present invention.
Figure 2F:
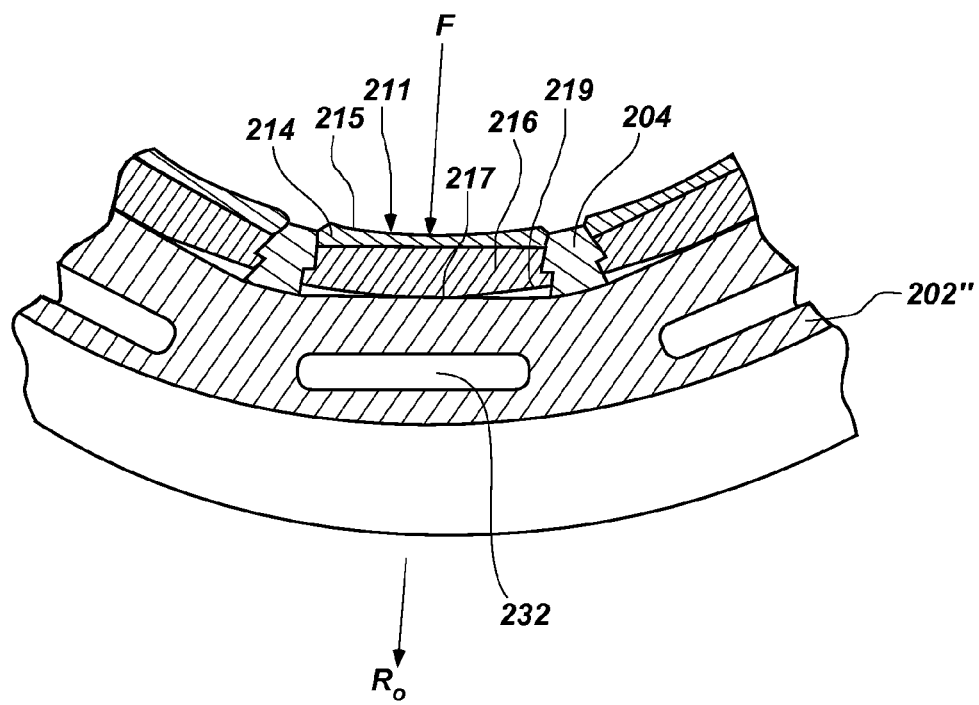
FIG. 2F is an enlarged, isometric cross-sectional view of a radial bearing assembly illustrating a compliance ring configured in accordance with a further embodiment of the present invention.
Figure 2G:
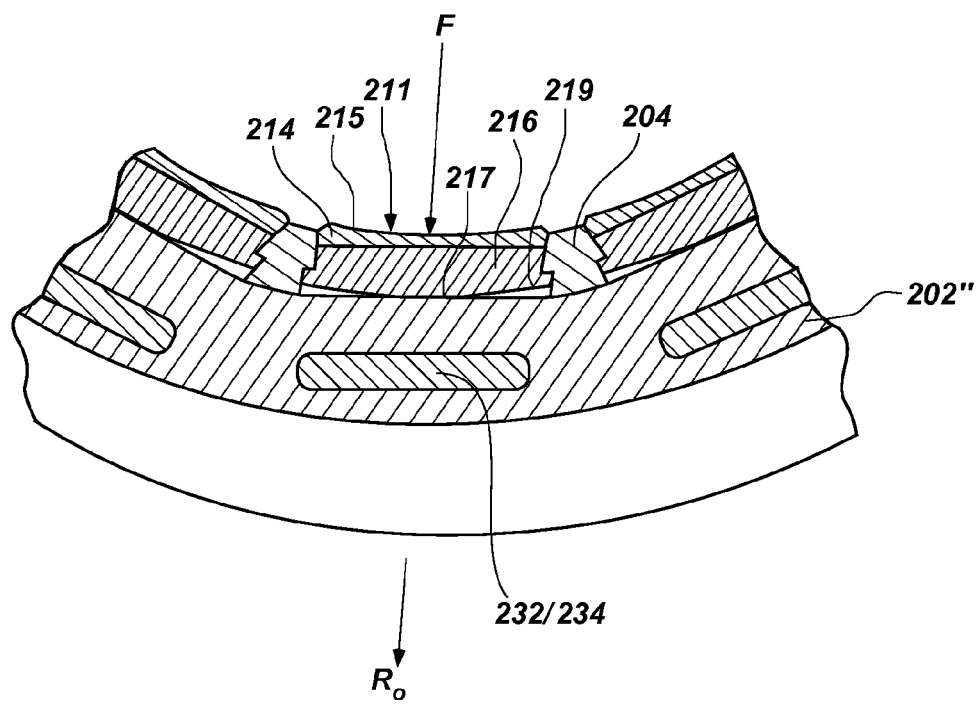
FIG. 2G is an enlarged, isometric cross-sectional view of a radial bearing assembly illustrating a compliance ring configured in accordance with yet another embodiment of the present invention.

FIGS. 2E through 2G show a number of different embodiments of the present invention for a compliance ring that also provides a selected compliance to the bearing elements 211. In the interest of brevity the same reference numerals are used in FIGS. 2E through 2G to represent the same components and features shown in FIGS. 2A through 2D, and an explanation of their function is not repeated unless the components and features function differently. As shown in FIG. 2E, a compliance ring 202' is provided with recesses 230 formed therein for providing a selected compliance to each of the bearing elements 211. Each of the recesses 230 is positioned radially adjacent to a corresponding bearing element 211. Thus, portions of the compliance ring 202' adjacent to and proximate to one of the recesses 230 exhibits a relatively higher compliance than that of portions of the compliance ring 202' between adjacent recesses 230. Accordingly, a force F applied to one of the bearing surfaces 215 may cause radial outward displacement of the bearing surface 215 in a direction $R_o$ in a manner similar to the radial bearing assembly 200 shown in FIGS. 2A through 2D.

Referring to FIG. 2F, a compliance ring 202" is provided with apertures 232 formed therein, each of which is positioned radially adjacent to a corresponding bearing element 211 for providing a selected compliance to each of the bearing elements 211. Each of the apertures 232 may extend partially or completely through the thickness of the compliance ring 202". As shown in FIG. 2G, in yet another embodiment of the present invention, a resilient, compliant member 234 may be positioned within each of the apertures 232 that enables further tailoring the selected compliance of the bearing elements 211. For example, each of the resilient, compliant members 234 may comprise a polymeric material (e.g., rubber), a metallic material, or another suitable resilient, compliant material. Thus, portions of the compliance ring 202" adjacent to and proximate to one of the apertures 232 exhibits a relatively higher compliance than that of portions of the compliance ring 202" between adjacent apertures 232. Accordingly, a force F applied to one of the bearing surfaces 215 causes radial outward displacement of the bearing surface 215 in a direction $R_o$ in a manner similar to the radial bearing assembly 200 shown in FIGS. 2A through 2D.

The bearing elements 211 may be fabricated from a number of different superhard materials. The term "superhard," as used herein, means a material having a hardness exceeding a hardness of tungsten carbide. For example, referring to FIGS. 2A and 2C, the bearing portion 214 may comprise a superhard table (e.g., a polycrystalline-diamond table) and the base portion 216 may comprise a substrate (e.g., a cobalt-cemented tungsten carbide substrate). However, any superhard material may be used, such as silicon carbide, a diamond-silicon carbide composite, polycrystalline cubic boron nitride, polycrystalline cubic boron nitride and polycrystalline diamond, or any other suitable superhard material.

Figure 2H:
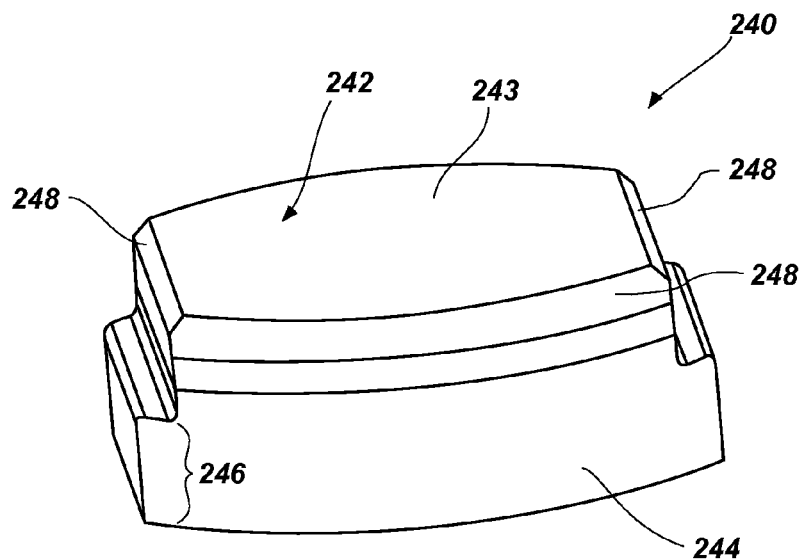
FIG. 2H is an isometric view of a bearing element according to another embodiment of the present invention.
Figure 2I:
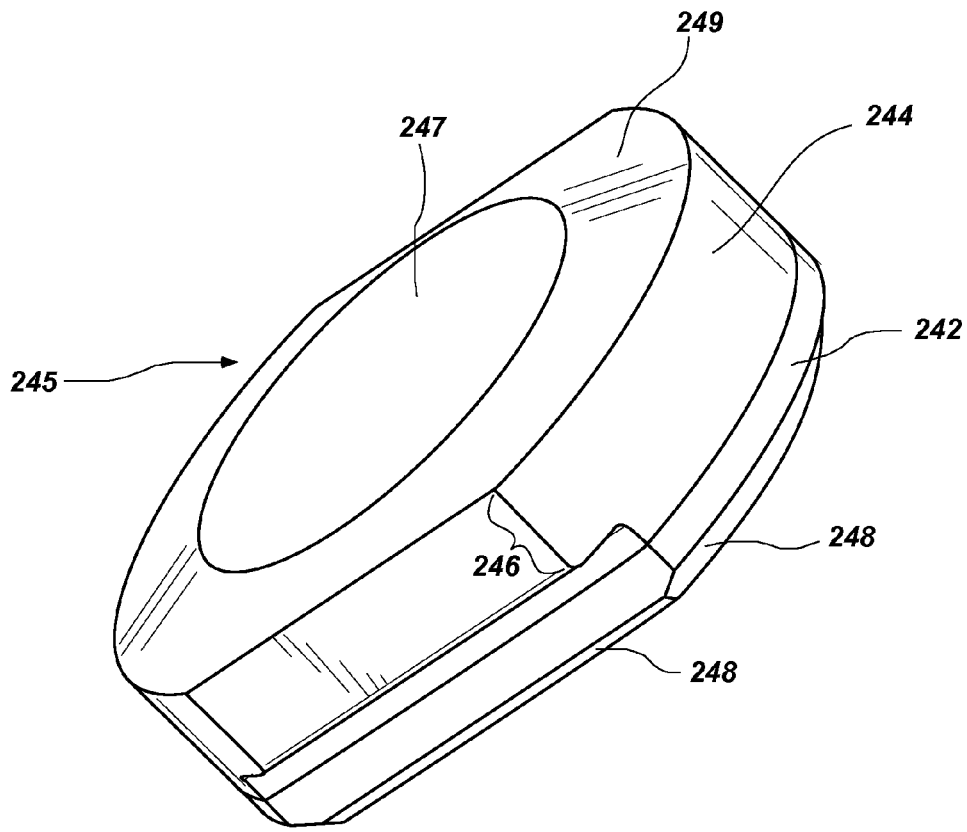
FIG. 2I is an isometric view of the bearing element shown in FIG. 2H illustrating a backside thereof in more detail.

A variety of different configurations may be used for the bearing elements that depart from the generally cylindrical shape shown in FIGS. 2A through 2G. For example, FIG. 2H shows a bearing element 240 according to another embodiment of the present invention. The bearing element 240 exhibits a generally, rounded, rectangular geometry. The bearing element 240 includes a superabrasive table 242 bonded to a substrate 244. The superabrasive table 242 includes a bearing surface 243. As illustrated in FIG. 2H, the substrate 244 includes a shoulder 246 that functions very similarly to the shoulder 218 shown most clearly in FIG. 2C to restrict inward radial displacement of the bearing element 240 through a through hole formed in a retention ring. In certain embodiments of the present invention, the superabrasive table 242 may have one or more chamfers 248 formed on edges of the superabrasive table 242. As shown in FIG. 2I, a backside 245 of the substrate 244 of the bearing element 240 may include a non-planar geometry. For example, the substrate 244 includes a contact surface 247 that may abut a beam of a compliance ring (e.g., the compliance ring 202 shown in FIG. 2A) and a peripherally extending chamfer 249. Accordingly, the contact surface 247 of the substrate 244 may function very similarly to the contact surface 217 of the bearing element 211 best shown in FIG. 2D.

Figure 3A:
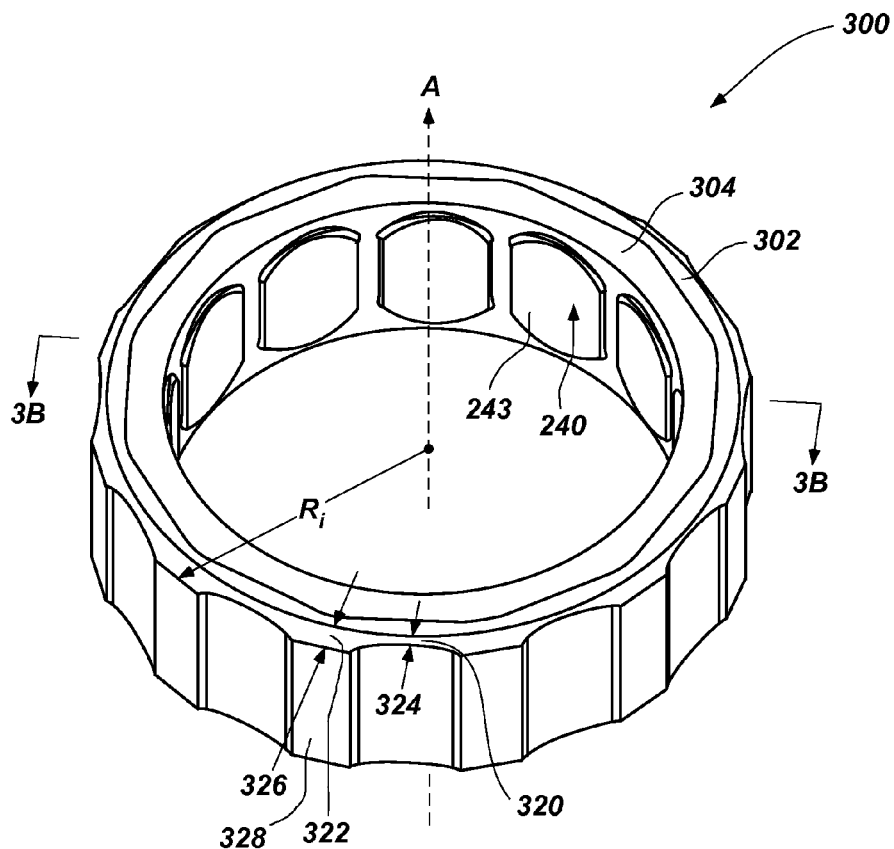
FIG. 3A is a top isometric view of a radial bearing assembly comprising a compliance ring including a plurality of beams according to another embodiment of the present invention.
Figure 3B:
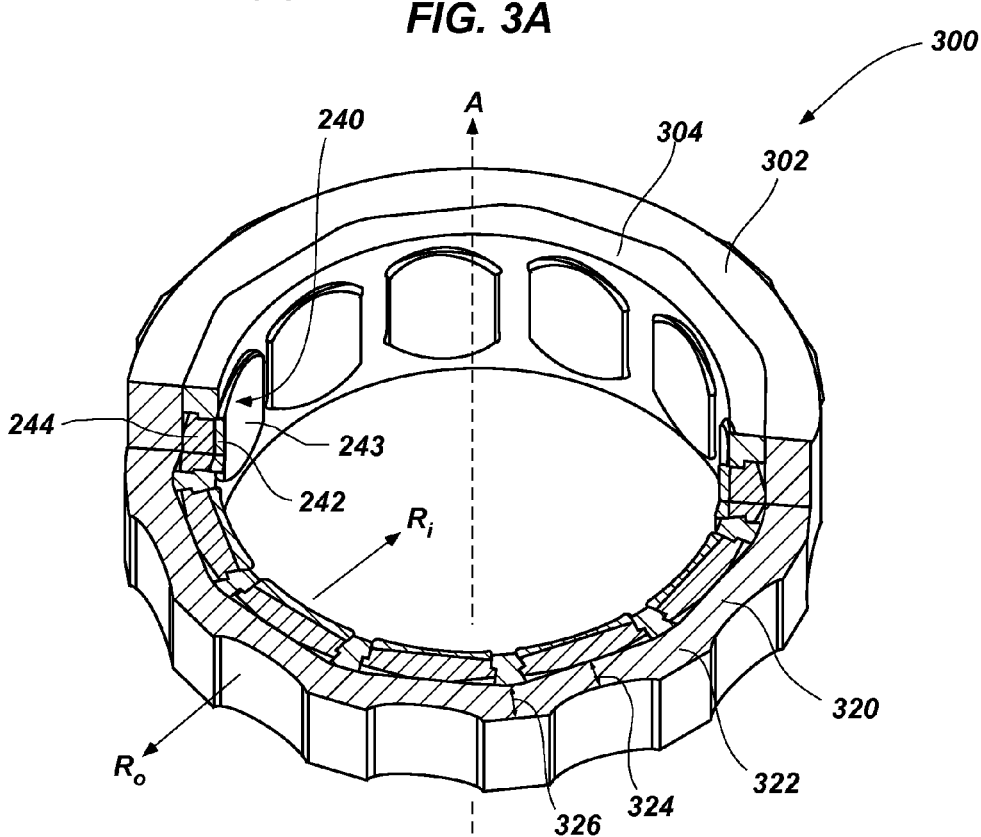
FIG. 3B is an isometric, partial, cut-away view of the radial bearing apparatus taken along line 3B-3B shown in FIG. 3A.

FIGS. 3A and 3B show a radial bearing assembly 300 according to another embodiment of the present invention. The radial bearing assembly 300 includes a compliance ring 302 that is configured in a different manner to also provide a selected amount of compliance to each bearing element 240. The radial bearing assembly 300 further includes a retention ring 304 that is configured very similar to the retention ring 204 shown in FIG. 2A, except that each aperture (not shown) that extends radially through the retention ring 304 is configured for receiving a corresponding bearing element 240 as shown and previously described with respect to FIGS. 2H and 2I. The compliance ring 302 includes a plurality of beams 320 circumferentially spaced apart the axis A. An interconnecting portion 322 extends circumferentially between adjacent beams 320. Each of the beams 320 exhibits a thickness 324 in a radial direction and each of the interconnecting portions 322 exhibits a thickness 326 in a radial direction that is greater than the thickness 324. Accordingly, the interconnecting portions 322 exhibit a lower compliance (i.e., greater stiffness) than the beams 320. In the illustrated embodiment, the thickness 324 varies with position circumferentially. However, in other embodiments of the present invention, the thickness 324 may be generally constant. Each of the interconnecting portions 322 includes an outer, peripheral surface 328 that may exhibit a convex curvature with a radius $R_j$ that corresponds to the curvature of a housing (not shown) that receives the radial bearing assembly 300.

As with the radial bearing assembly 200, the compliance ring 302 provides a selected compliance to each of the bearing elements 240. As shown in FIG. 3B, in operation, when one or more of the bearing elements 240 are loaded to a greater extent than other bearing elements 240, the bearing elements 240 loaded to a greater extent may bias or deform one or more corresponding beams 320 radially outward in a direction $R_o$ to distribute loading over the bearing surfaces 243. The deflection of a beam 320 also allows displacement of a corresponding bearing surface 243 radially outward in the direction $R_o$. The deflection of the beams 320 is predominately elastic deformation and, thus, the bearing surface 243 is displaced in a radially inward direction $R_i$ to its neutral position (i.e., unloaded position), shown in FIGS. 3A and 3B, upon removal of the radial outward load applied to the bearing surface 243.

Figure 4A:
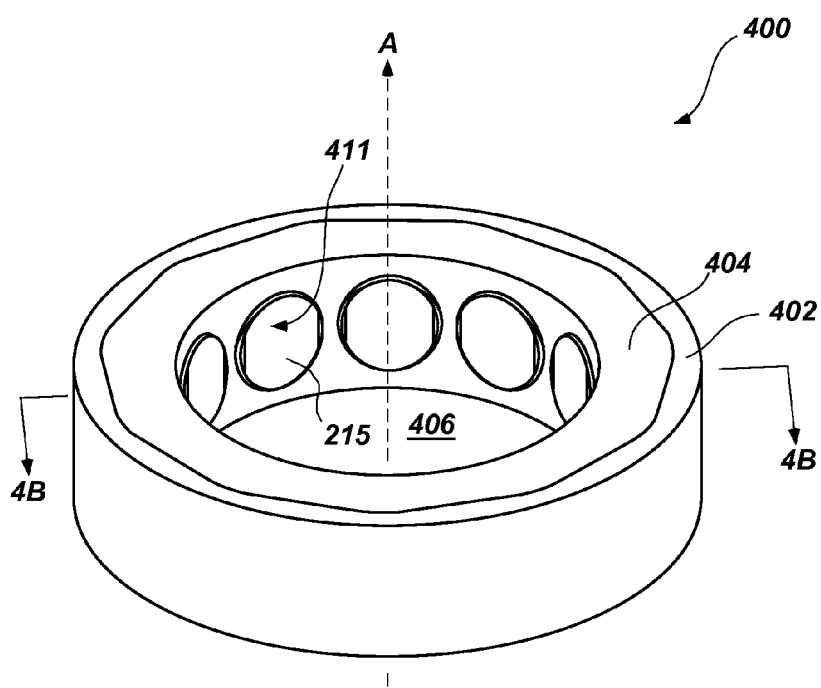
FIG. 4A is an isometric view of a radial bearing assembly comprising a support ring, a retention ring, and a plurality of resilient biasing elements positioned between bearing elements and the support ring according to another embodiment of the present invention.
Figure 4B:
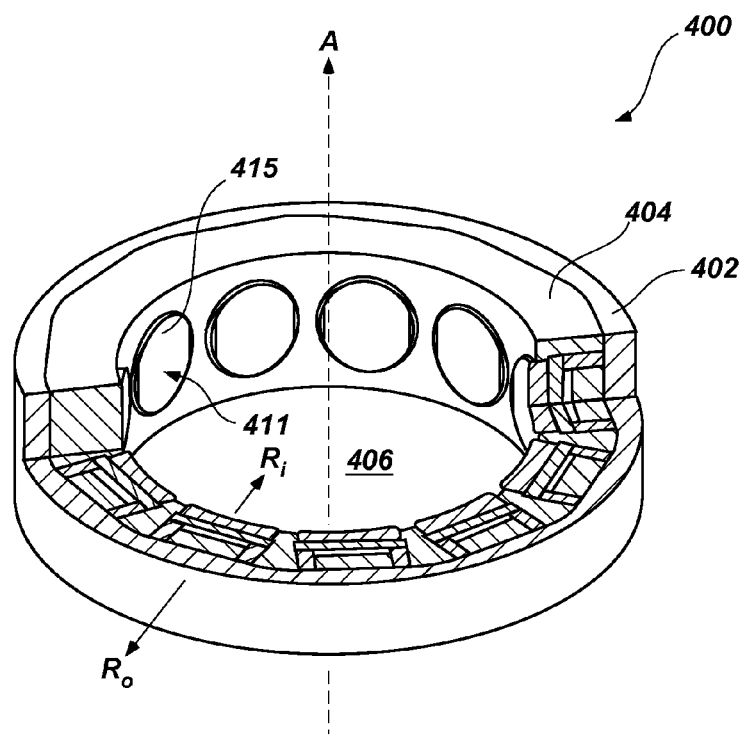
FIG. 4B is an isometric, partial, cut-away view of the radial bearing apparatus shown in FIG. 4A taken along line 4B-4B.
Figure 4C:
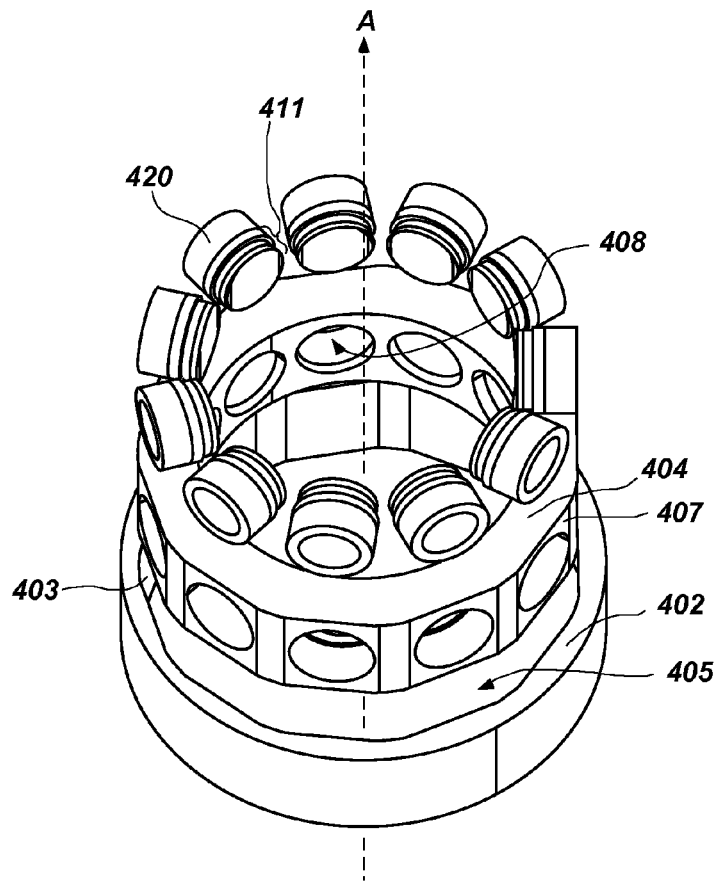
FIG. 4C is an exploded, top isometric view of the radial bearing assembly shown in FIG. 4A.
Figure 4D:
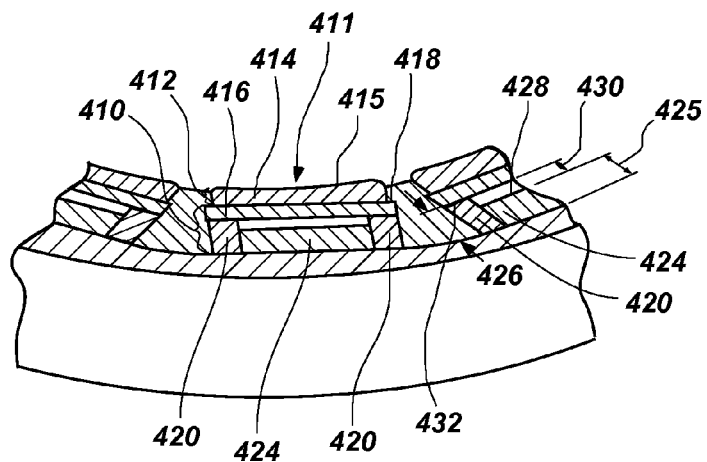
FIG. 4D is an enlarged, isometric cross-sectional view of the radial bearing assembly shown in FIG. 4B illustrating one of the bearing elements and biasing elements in more detail.

FIGS. 4A through 4D show a radial bearing assembly 400 according to yet another embodiment of the present invention. The radial bearing assembly 400 includes an outer, support ring 402 extending about an axis A. The support ring 402 includes an inner, peripheral surface 403 (FIG. 4C) defining an aperture 405 (FIG. 4C). The aperture 405 (FIG. 4C) of the support ring 402 is shaped to receive a retention ring 404 that also extends about the axis A. The retention ring 404 includes an outer, peripheral surface 407 (FIG. 4C) shaped to correspond to the inner, peripheral surface 403 (FIG. 4C) of the support ring 402. The retention ring 404 defines an aperture 406 (FIGS. 4A and 4B) configured to receive, for example, another radial bearing assembly that is coupled to a shaft of a downhole motor or other apparatus. The retention ring 404 includes a plurality of counterbore through holes 408 (FIG. 4C) that extend radially through the retention ring 404. As best shown in FIG. 4D, each of the through holes 408 includes an large-diameter hole portion 410 with a first diameter and a small-diameter hole portion 412 with a second diameter less than the first diameter. The support ring 402, retention ring 404 may be made from the same materials as previously described above with respect to the radial bearing assembly 200.

The radial bearing assembly 400 further includes a plurality of bearing elements 411, each of which is inserted through a corresponding through hole 408 (FIG. 4C) of the retention ring 404 from the outer, peripheral surface 407 (FIG. 4C) thereof. As best shown in FIG. 4D, each of the bearing elements 411 includes a bearing portion 414 with a bearing surface 415, and a base portion 416 that comprises a shoulder 418. Furthermore, as previously described with respect to the radial bearing assembly 200, the shoulder 418 of each of the bearing elements 411 functions to limit inward radial displacement thereof through a corresponding through hole 408 (FIG. 4C).

Figure 4E:
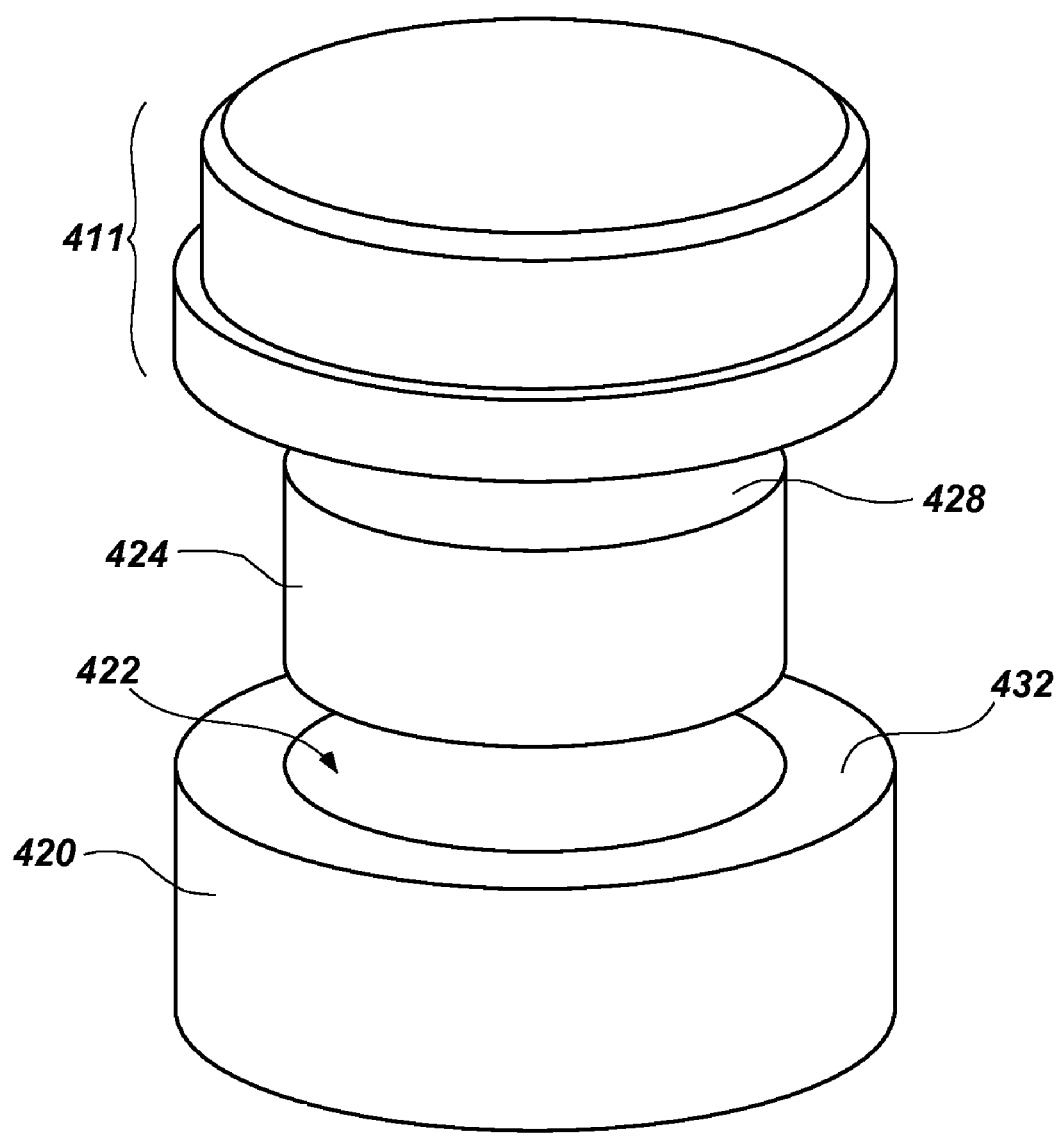
FIG. 4E is an exploded isometric view of a bearing element and a corresponding biasing element shown in FIGS. 4B through 4D.

As best shown in FIGS. 4D and 4E, a biasing element 420 (e.g., a metallic tube) is positioned within the large-diameter portion 410 of each of the through holes 408, and further positioned radially outward and behind each of the bearing elements 411. In certain embodiments of the present invention, each of the biasing elements 420 may include one or more recesses or through holes to enable tailoring the compliance thereof. In some embodiments of the present invention, a stopper element 424 is positioned within a passageway or recess 422 (FIG. 4D) formed in each of the biasing elements 420. Each of the stopper elements 424 exhibits a length 425 that is less than a length 426 exhibited by the biasing element 420. Thus, when the bearing elements 411 are assembled with the biasing elements 420, support ring 402, and retention ring 404, an end 428 of each of the stopper elements 428 is positioned at a standoff distance 430 from an end 432 of a corresponding biasing element 420. Thus, by axially compressing one of the biasing elements 420 with one of the bearing elements 411, the bearing surface 415 of the bearing element 411 is capable of outward radial displacement in a direction $R_o$ a distance approximately equal to the standoff distance 430. The compression of the biasing elements 420 is predominately elastic and, thus, the bearing surface 415 is displaced in a radially inward in a direction $R_i$ to its neutral position (i.e., unloaded position), shown in FIGS. 4A and 4B, upon removal of the radially outward load applied to the bearing surface 415.

Figure 5A:
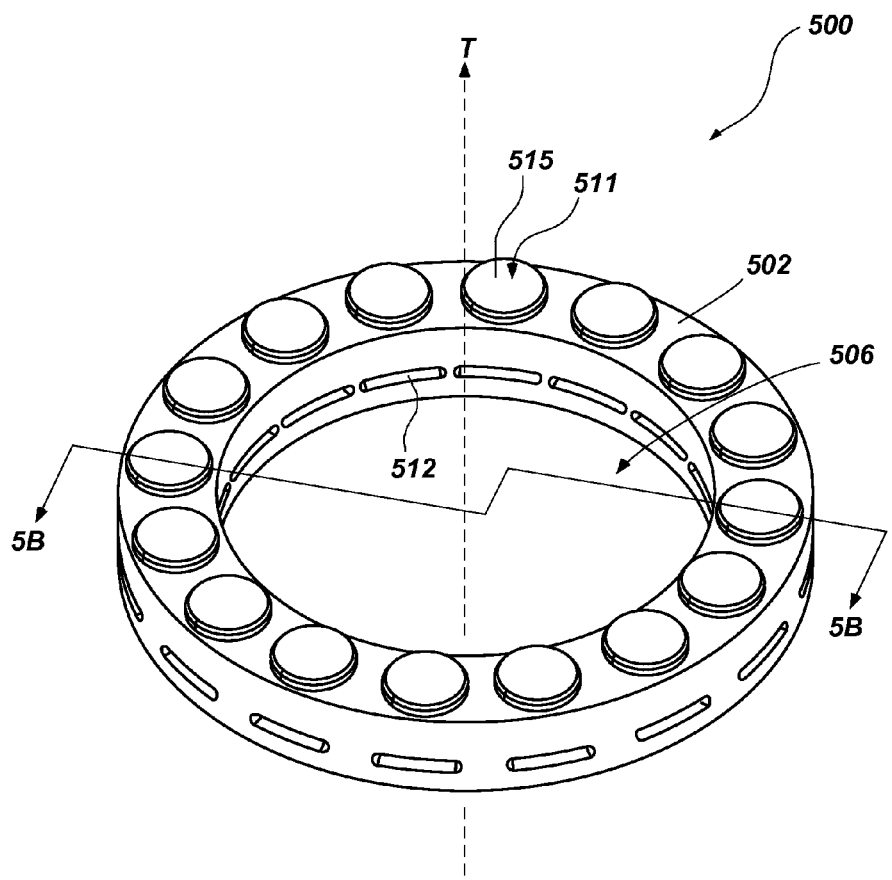
FIG. 5A is a top isometric view of a thrust-bearing assembly comprising a compliance ring including a plurality of beams according to yet another embodiment of the present invention.
Figure 5B:
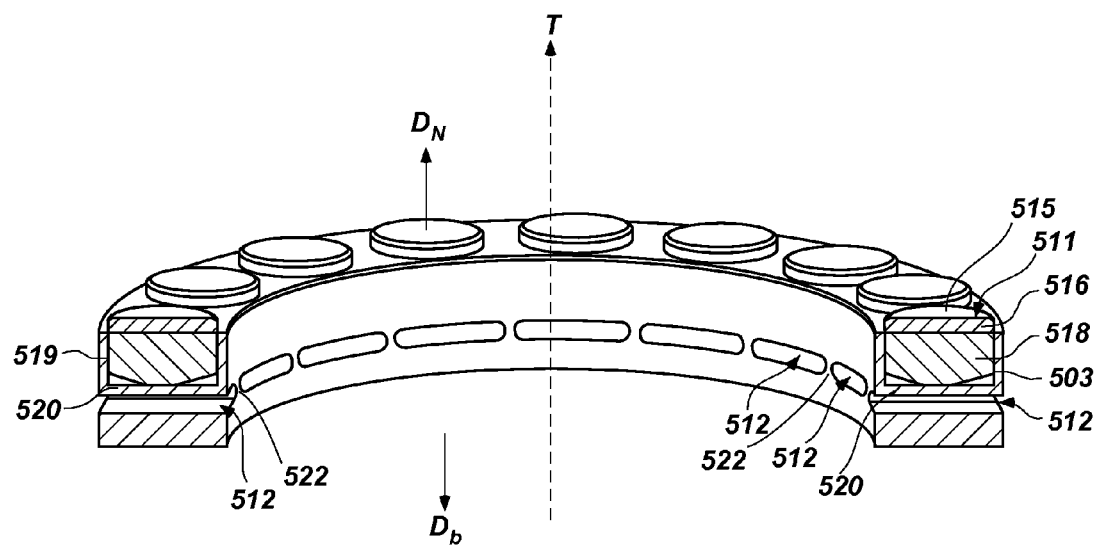
FIG. 5B is an isometric cut-away view of the thrust-bearing assembly shown in FIG. 5A taken along line 5B-5B.

The concepts described above with respect to the radial bearing assemblies 200, 300, and 400 may also be utilized in thrust-bearing assemblies. FIGS. 5A and 5B show a thrust-bearing assembly 500 according to one embodiment of the present invention that is also configured to provide a selected compliance to each of the bearing elements. The thrust-bearing assembly 500 includes a support ring 502 defining an aperture 506. The support ring 502 is substantially centered about a thrust axis T in which thrust may be generally directed along during use. The support ring 502 includes a number of recesses 503 (FIG. 5B) formed therein. As shown in FIG. 5B, a bearing element 511, with a bearing surface 515, is positioned within each of the recesses 503. Each of the recesses 503 is defined by at least one sidewall 519 and a beam or base 520. As will be discussed in more detail below, the beam 520 of each of the recesses 503 provides a selected compliance to a corresponding bearing element 511. Radially and circumferentially extending slots 512 formed within the support ring 502 allow the beams 520 to bias or deform in a direction $D_b$ generally parallel to the thrust axis T responsive a load applied in a direction $D_b$ to the bearing elements 511.

The bearing elements 511 may be formed from the same or similar materials as the bearing elements 211 previously described. In the embodiment illustrated in FIGS. 5A and 5B, the bearing elements 511 do not have a shoulder configured to restrict attempted displacement of the bearing elements 511. Instead, each of the bearing elements 511, with a superhard table 516 bonded to a substrate 518, may be secured within a corresponding recess 503 by press-fitting, brazing, using a fastener that couples the substrate 518 to the support ring 502, or another suitable technique.

Again, as shown in FIG. 5B, an interconnecting portion 522 extends circumferentially between adjacent beams 520. The interconnecting portions 522 exhibit a relatively lower compliance (i.e., a greater stiffness) than that of the beams 520. Accordingly, the thrust-bearing assembly 500 functionally provides a selected compliance to each of the bearing elements 511 in a manner similar to the previously described radial bearing assemblies. For example, when the bearing surface 515 of one of the bearing elements 511 is loaded to a sufficient extent, the bearing element 511 may bias or deform a corresponding beam 520 in a direction $D_b$ generally parallel to the thrust axis T in order to distribute the load applied to the bearing elements 511. The deflection of a beam 520 also allows displacement of a corresponding bearing surface 515 in the direction $D_b$. Because the deformation of the beams 520 is predominately elastic, the bearing surface 515 is displaced in a direction $D_n$ to its neutral position (i.e., unloaded position), shown in FIGS. 5A and 5B, upon removal of a load applied in the direction $D_b$ to the bearing surface 215. Again, a representative magnitude for the maximum deflection of a beam 520 may be about 0.0010 inches.

Figure 5C:
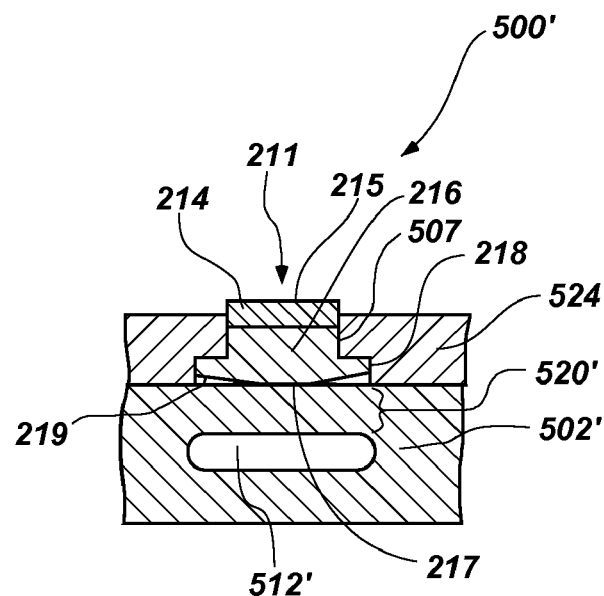
FIG. 5C is a side cross-sectional view of a portion of a thrust-bearing assembly taken along a circumferential direction according to another embodiment of the present invention.

FIG. 5C shows another embodiment of the present invention for a compliant thrust-bearing assembly. A thrust-bearing assembly 500' utilizes bearing elements 211 with a shoulder 218 configured to restrict displacement thereof. As shown in FIG. 5C, the thrust-bearing assembly 500' includes a compliance ring 502', similar in construction to the compliance ring 502 shown in FIGS. 5A and 5B, with radially and circumferentially extending slots 512' and beams 520'. The thrust-bearing assembly 500' also includes a retention ring 524 with counterbore through holes 507 formed therein. The retention ring 524 is assembled with the compliance ring 502' and the bearing elements 211 so that the bearing elements 211 are retained between the compliance ring 502' and the retention ring 524 in a similar manner to the radial bearing assembly 200 shown in FIGS. 2A through 2C.

Figure 5D:
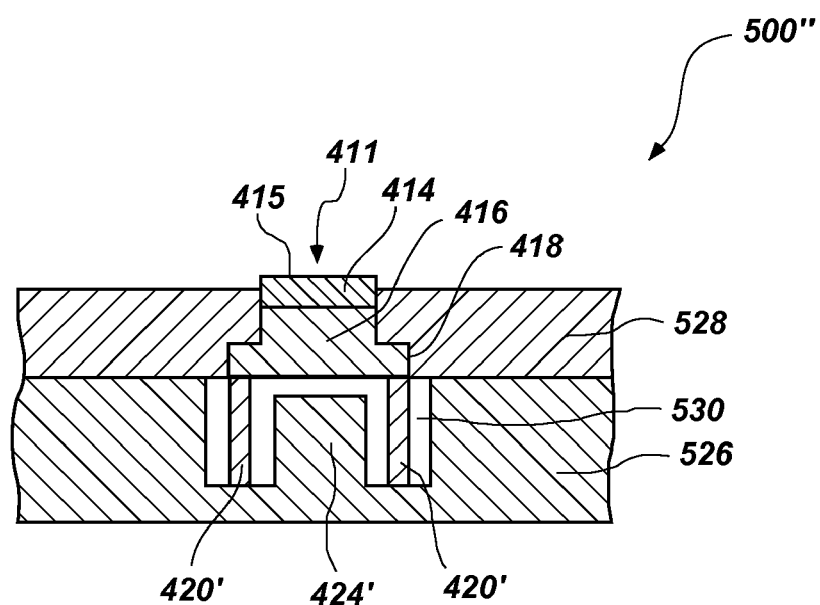
FIG. 5D is a side cross-sectional view of a thrust-bearing assembly taken along a circumferential direction according to yet another embodiment of the present invention.

FIG. 5D shows yet another embodiment of the present invention for a compliant thrust-bearing assembly that provides a selected compliance to each of the bearing elements in a manner similar to the radial bearing assembly 400 shown in FIGS. 4A through 4D. As shown in FIG. 5D, a thrust-bearing assembly 500" comprises a support ring 526 including a plurality of annular slots 530 formed therein to define corresponding stopper portions 424'. A biasing element 420' is positioned within each of the annular slots 530. The thrust-bearing assembly 500" further includes a retention ring 528 assembled with the support ring 526 and the bearing elements 411. The bearing elements 411 are retained between the support ring 526 and the retention ring 528 in a manner similar to the radial bearing assembly 400 due to the physical interference of the shoulder 418 of the bearing elements 411 with the retention ring 528. Loading of one of the bearing surfaces 415 axially compresses the hollow biasing element 420' until a corresponding stopper element 424' prevents further axial compression of the corresponding biasing element 420'.

Figure 6A:
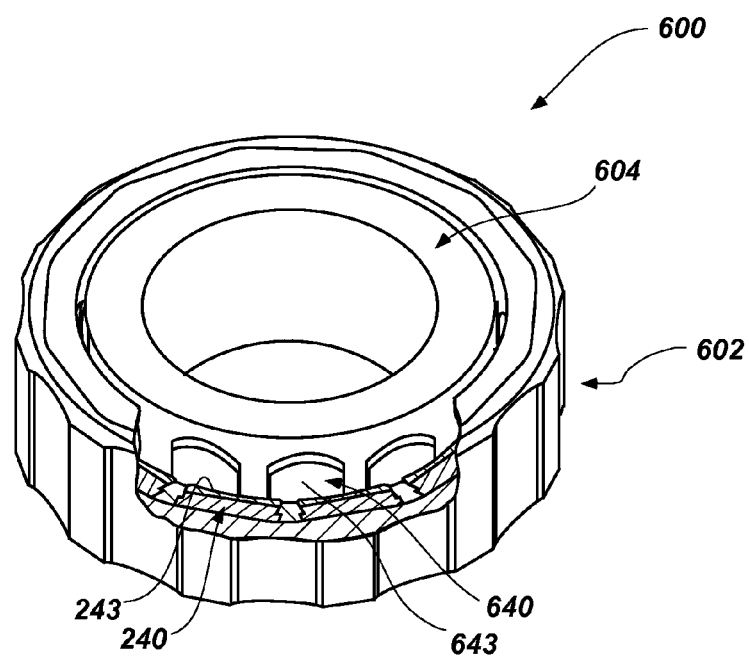
FIG. 6A is an isometric view of a radial bearing apparatus including an outer race configured as the radial bearing assembly shown in FIGS. 3A through 3C according to one embodiment of the present invention, with a portion of the outer race removed to reveal a portion of the inner race.
Figure 6B:
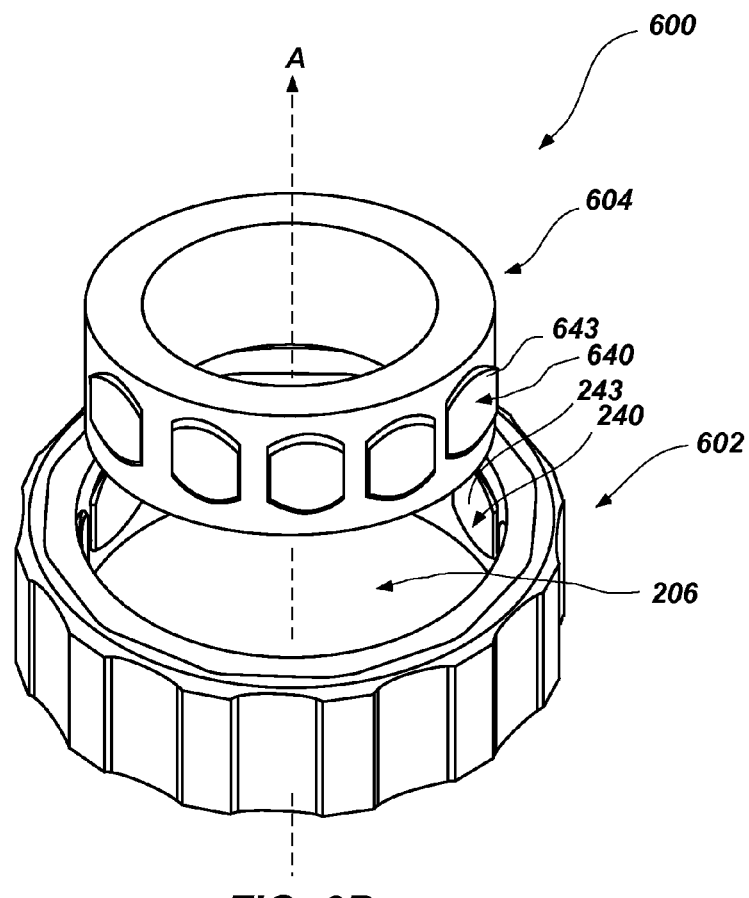
FIG. 6B is an exploded isometric view of the radial bearing apparatus shown in FIG. 6A.

Any of the previously described radial bearing assemblies and thrust-bearing assemblies may be used in a bearing apparatus that employs two bearing assemblies, at least one of which may be configured as any of the previously described bearing assemblies. For example, FIGS. 6A and 6B show a radial bearing apparatus 600 according to one embodiment of the present invention. The radial bearing apparatus 600 includes an outer race or stator 602 that is shown configured as the radial bearing assembly 300 shown in FIGS. 3A through 3B. The outer race 602 defines an aperture 206 that receives an inner race or rotor 604. The inner race 604 includes a number of bearing elements 640 with convex bearing surfaces 643 that correspond to the concave bearing surfaces 243 of the outer race 602. The terms "rotor" and "stator" refer to rotating and stationary components of a radial bearing or thrust-bearing apparatus, respectively. Thus, if the inner race 604 is configured to remain stationary, the inner race 604 can be referred to as the stator and the outer race 602 can be referred to as the rotor. When the inner race 604 and the outer race 602 are assembled, the bearing surfaces 643 of the inner race 604 and the opposing bearing surfaces 243 of the outer race 602 can bear against each other. As previously discussed, loading of the radial bearing apparatus 600 (i.e., loading in a direction non-parallel to the axis A) or tilting of the rotor and/or stator with respect to one another may cause some of the bearing elements 240 of the outer race 602 to be loaded to an extent by the bearing elements 606 of the inner race 604 that causes the bearing elements 240 to be deflected radially outward. The ability of the bearing elements 240 to deflect in a radially outward direction can help alleviate such a non-uniform loading condition and may also help prevent fracture of the bearing elements 240 and 640 due to dynamic loading.

The radial bearing apparatus 600 may be employed in a variety of different mechanical applications. For example, so-called "roller cone" rotary drill bits may benefit from one of the radial bearing apparatuses disclosed herein. More specifically, the inner race 604 may be mounted or affixed to a spindle of a roller cone and the outer race 602 may be affixed to an inner bore formed within a cone and that such an outer race 602 and inner race 604 may be assembled to form a radial bearing apparatus 600. It should also be noted, that although the radial bearing assemblies shown and described with respect to FIGS. 2A through 4E were illustrated as an outer race configured to provide a selected compliance to each bearing element thereof, the radial bearing assemblies disclosed herein may also be configured for providing a selected compliance to each of the bearing elements thereof. Moreover, an inner race, outer race, or both of a radial bearing apparatus may be configured to provide compliance to the bearing elements.

Figure 7:
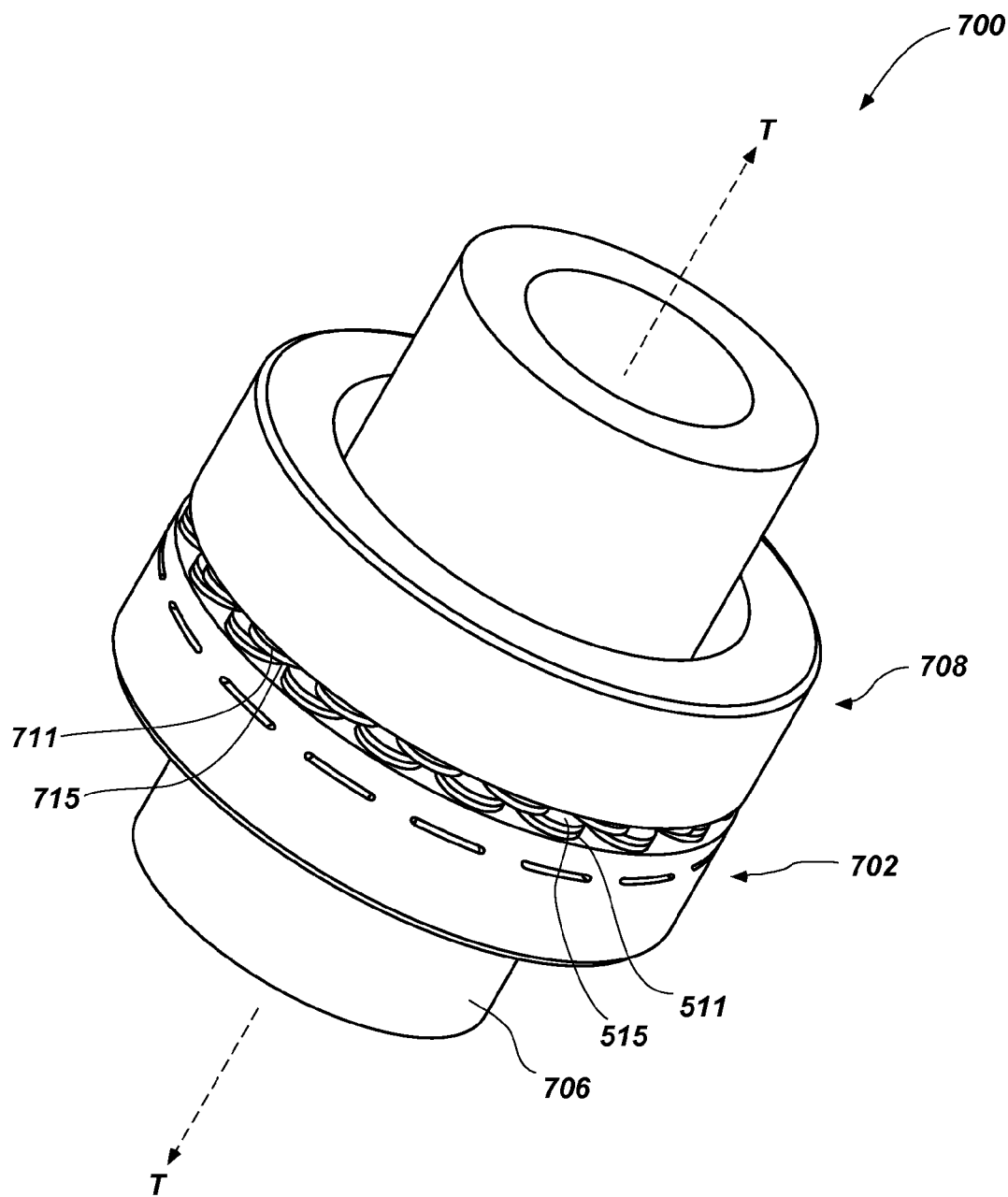
FIG. 7 is an isometric view of a thrust-bearing apparatus including the thrust-bearing assembly shown in FIGS. 5A and 5B.

Additional embodiments of the present invention are directed to thrust-bearing apparatuses. A thrust-bearing apparatus may include, for example, at least one thrust-bearing assembly configured as the thrust-bearing assembly shown in FIGS. 5A and 5B. FIG. 7 shows a thrust-bearing apparatus 700 according to one embodiment of the present invention. The thrust-bearing apparatus 700 includes a thrust-bearing assembly 702 configured as any of the previously described embodiments of thrust-bearing assemblies (See FIGS. 5A through 5D) coupled to a shaft 706 of an apparatus, such as a downhole motor. For example, the thrust-bearing assembly 702 is configured as the thrust-bearing assembly 500 shown in FIGS. 5A and 5B. Thus, in the illustrated embodiment, the thrust-bearing assembly 702 can be referred to as a rotor because the thrust-bearing assembly 702 rotates when the shaft 706 rotates. The thrust-bearing apparatus 700 further includes a thrust-bearing assembly 708, which may also be configured as any of the previously described embodiments for thrust-bearing assemblies or may be conventional in construction. The thrust-bearing assembly 708 may remain stationary and, thus, may be referred to as a stator. The thrust-bearing assembly 708 includes a plurality of bearing elements 711 with respective bearing surfaces 715 that oppose and bear against respective bearing surfaces 515 of the bearing elements 511 during use. As previously discussed, certain loading conditions of the thrust-bearing apparatus 700 (i.e., loading in a direction non-parallel to the thrust axis T) may cause some of the bearing elements 511 of the thrust-bearing assembly 702 to be non-uniformly loaded. Additionally, non-uniform loading of the bearing elements 511 and 711 can be caused by a slight angular misalignment between the thrust-bearing assemblies 706 and 708. The ability of the bearing elements 511 to deflect can help alleviate such non-uniform loading conditions.

Figure 8:
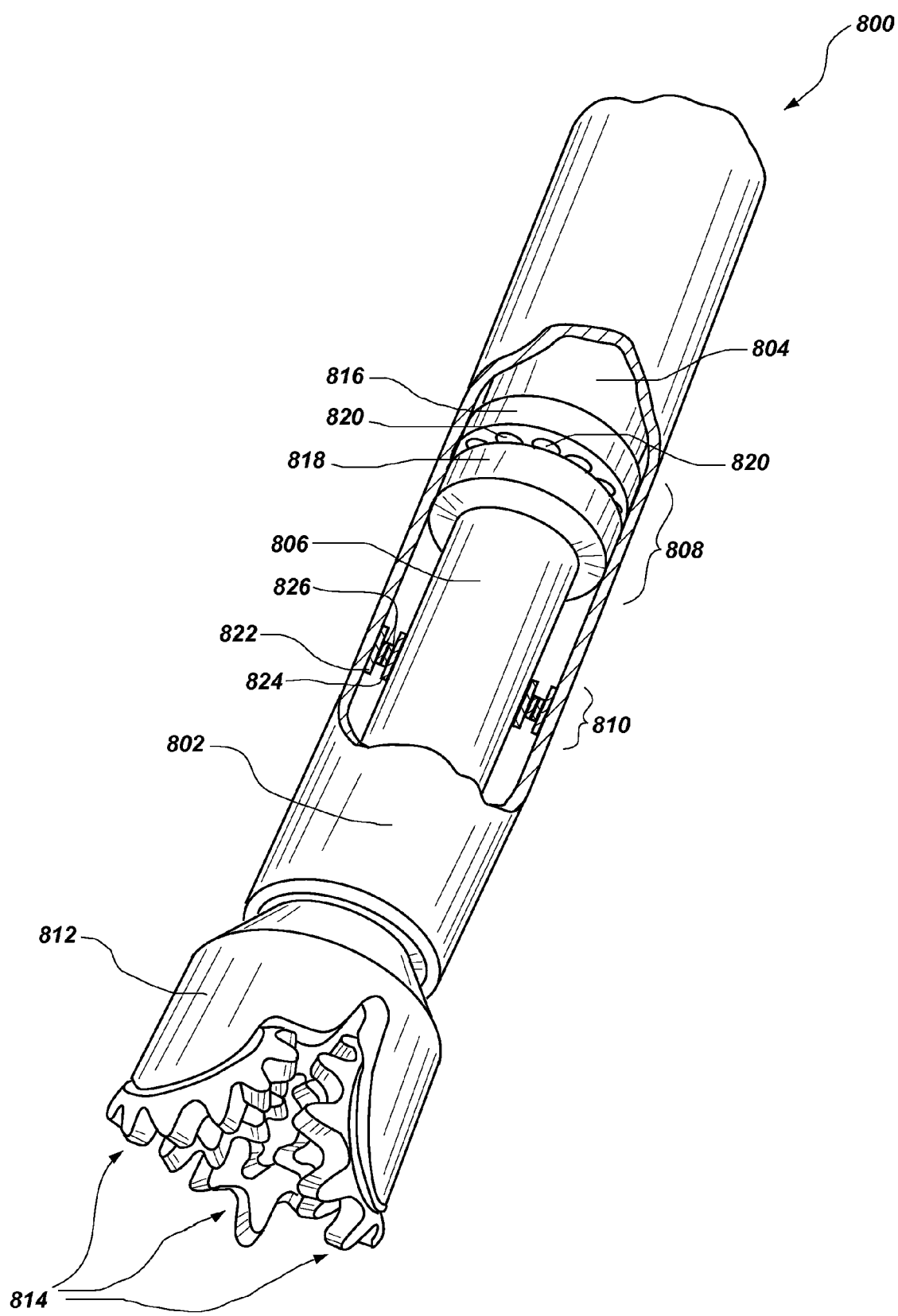
FIG. 8 is a schematic isometric, partial, cut-away view of a subterranean drilling system including a thrust-bearing apparatus and/or a radial bearing apparatus utilizing any of the previously described bearing assemblies according to various embodiments of the present invention.

Any of the embodiments for bearing apparatuses discussed above may be used in a subterranean drilling system. FIG. 8 shows a subterranean drilling system 800 according to one embodiment of the present invention. The subterranean drilling system 800 includes a housing 802 enclosing a downhole drilling motor 804 (i.e., a motor, turbine, or any other device capable of rotating an output shaft) that is operably connected to an output shaft 806. A thrust-bearing apparatus 808 and a radial bearing apparatus 810 are also operably coupled to the downhole drilling motor 804. The thrust-bearing apparatus 808, radial bearing apparatus 810, or both may be configured as any of the previously described bearing apparatus embodiments. A rotary drill bit 812 configured to engage a subterranean formation and drill a borehole is connected to the output shaft 806. The rotary drill bit 812 is shown as a "roller cone" type bit including a plurality of roller cones 814. However, other embodiments of the present invention may utilize different types of rotary drill bits, such as so called "fixed cutter" drill bits. As the borehole is drilled, pipe sections may be connected to the subterranean drilling system 800 to form a drill string capable of progressively drilling the borehole to a greater depth within the earth.

In one embodiment of the present invention, the thrust-bearing apparatus 808 includes a stator 816 that does not rotate and a rotor 818 that is attached to the output shaft 106 and rotates with the output shaft 806. The stator 816 and rotor 818 each include a plurality of bearing elements 820. In one embodiment of the present invention, the radial bearing apparatus 810 includes an outer race 822 (i.e., a stator) that does not rotate and an inner race 824 (i.e., a rotor) that is attached to the output shaft 806 and rotates with the output shaft 806. The inner race 824 and outer race 822 also each include a plurality of bearing elements 826. In operation, drilling fluid may be circulated through the downhole drilling motor 804 to generate torque and effect rotation of the output shaft 806 and the rotary drill bit 812 attached thereto so that a borehole may be drilled. The drilling fluid may also be used for lubricating and cooling the bearing surfaces of the bearing elements 820 and 826 during operation.

Although the bearing assemblies and apparatuses described above have been discussed in the context of subterranean drilling systems and applications, in other embodiments of the present invention, the bearing assemblies and apparatuses disclosed herein are not limited to such use and may be used for many different applications, if desired, without limitation. Thus, such bearing assemblies and apparatuses are not limited for use with subterranean drilling systems and may be used with various other mechanical systems, without limitation. Additionally, although the beams used in the embodiments described above may be are fixed at both ends, in other embodiments of the present invention, each of the beams may comprise one or more cantilevered beams. Moreover, the ability to secure bearing elements using a suitably configured retention ring in conjunction with a bearing element comprising a shoulder may be utilized with or without a compliance ring. For example, a relatively rigid support ring may be used instead of a compliance ring.

The foregoing description, for purposes of explanation, used specific nomenclature to provide a thorough understanding of the present invention. However, it will be apparent to one skilled in the art that the specific details are not required in order to practice the present invention. The foregoing descriptions of specific embodiments of the present invention are presented for purpose of illustration and description. They are not intended to be exhaustive or to limit the invention to the precise forms disclosed. One ordinary skill in the art will recognize that many modifications and variations are possible in view of the above teachings. The embodiments are shown and described in order to best explain the principles of the present invention and its practical applications, to thereby enable others skilled in the art to best utilize the invention and various embodiments with various modifications as are suited to the particular use contemplated. It is intended that the scope of the present invention be defined by the following claims and their equivalents. The words "including" and "having," or variants thereof as used herein, including the claims, shall have the same meaning as the word "comprising."

The invention claimed is:

1. A bearing assembly for use in a subterranean drilling system, the bearing assembly comprising:
   a support ring;
   a retention ring attached to the support ring, the retention ring including a plurality of through holes; and
   a plurality of bearing elements each of which includes a superhard bearing surface and a generally opposing base surface, each of the bearing elements positioned in and extending from a corresponding through hole of the plurality of through holes, at least a number of the bearing elements each including a shoulder, the shoulder of each of the at least a number of the bearing elements disposed between the support ring and the retention ring and residing in the corresponding through hole, the shoulder of each of the at least a number of the bearing elements configured to restrict displacement of a corresponding one of the at least a number of the bearing elements through the corresponding through hole away from the support ring in a first direction, and the base surface of each of the at least a number of the bearing elements positioned and configured to restrict displacement of the corresponding one of the at least a number of the bearing elements through the corresponding through hole and toward the support ring in a second direction that is generally opposite the first direction.

2. The bearing assembly of claim 1 wherein:
   each of the through holes comprises a first portion exhibiting a first lateral dimension and a second portion exhibiting a second lateral dimension less than the first lateral dimension
   each of the at least a number of the bearing elements comprises a superhard table comprising one of the superhard bearing surfaces and a substrate comprising the shoulder, the shoulder of each of the at least a number of the bearing elements at least partially residing in the first portion of the corresponding through hole, the shoulder of each of the at least a number of the bearing elements configured to restrict displacement through the through hole away from the support ring.

3. The bearing assembly of claim 2 wherein the superhard table comprises polycrystalline diamond and the substrate comprises a cemented carbide material.

4. The bearing assembly of claim 1 wherein the shoulder comprises a flange portion.

5. The bearing assembly of claim 1 wherein the shoulder is an integral shoulder configured to restrict displacement through the corresponding through hole away from the support ring.

6. The bearing assembly of claim 1 wherein:
   the support ring extends about a thrust axis; and
   displacement of the at least a number of the bearing elements in the first direction generally parallel to the thrust axis is restricted due to physical interference between the at least a number of the bearing elements and the retention ring.

7. The bearing assembly of claim 1 wherein:
   the support ring extends about a rotation axis; and
   displacement of the at least a number of the bearing elements in a radial direction is restricted due to physical interference between the at least a number of the bearing elements and the retention ring.

8. The bearing assembly of claim 1 wherein:
   the support ring comprises a plurality of beams each of which is circumferentially spaced from each other; and
   each of the bearing elements is positioned to deform a corresponding beam of the plurality of beams when loaded.

9. The bearing assembly of claim 8 wherein each of the at least a number of the bearing elements comprises a contact surface that forms only part of the base surface thereof, each of the at least a number of the bearing elements positioned to deform a corresponding beam of the plurality of beams by the contact surface thereof biasing a portion thereof comprising a longitudinal midpoint when loaded.

10. The bearing assembly of claim 9 wherein each of the at least a number of the bearing elements comprises a circumferentially-extending chamfer that extends about the contact surface thereof.

11. The bearing assembly of claim 1 wherein the retention ring is attached to the support ring by at least one of pressfitting, shrink-fitting, welding, brazing, or at least one fastener.

12. The bearing assembly of claim 1 wherein at least a portion of the plurality of bearing elements comprises polycrystalline diamond.

13. The bearing assembly of claim 1 wherein at least a portion of the plurality of bearing elements comprises a diamond-silicon carbide composite.

14. The bearing assembly of claim 1 wherein at least a portion of the plurality of bearing elements comprises a polycrystalline diamond table bonded to a cemented carbide substrate.

15. A bearing apparatus comprising a rotor and a stator, wherein at least one of the rotor or the stator comprises the bearing assembly of claim 1.

16. A motor assembly for use in drilling subterranean formations, comprising:
   a motor operable to apply torque to a rotary drill bit, the motor operably coupled to a bearing apparatus, the bearing apparatus including a rotor and a stator; and
   wherein at least one of the rotor or the stator comprises the bearing assembly of claim 1.

17. A bearing assembly for use in a subterranean drilling system, the bearing assembly comprising:

a support ring;

a retention ring attached to the support ring, the retention ring including a plurality of through holes, each of the through holes exhibiting a lateral dimension that is greater proximate to the support ring; and a plurality of superhard bearing elements, each of the superhard bearing elements including a superhard bearing surface and a generally opposing base surface, each of the superhard bearing elements positioned in and extending from a corresponding through hole of the plurality of through holes, at least a number of the superhard bearing elements each including a shoulder, the shoulder of each of the at least a number of the superhard bearing elements disposed between the support ring and the retention ring and residing in the corresponding through hole, the shoulder of each of the at least a number of the superhard bearing elements configured to restrict displacement of a corresponding one of the at least a number of the superhard bearing elements through the corresponding through hole away from the support ring in a first direction, and the base surface of each of the at least a number of the superhard bearing elements positioned and configured to restrict displacement of the corresponding one of the at least a number of the superhard bearing elements through the corresponding through hole and toward the support ring in a second direction that is generally opposite the first direction.

18. The bearing assembly of claim 17 wherein the shoulder is an integral shoulder that restricts displacement through the corresponding through hole away from the support ring in the first direction.

19. The bearing assembly of claim 17 wherein at least a portion of the plurality of bearing elements comprises a superhard table bonded to a substrate that includes a corresponding one of the shoulders.

20. A bearing apparatus for use in a subterranean drilling system, the bearing apparatus comprising:

a rotor; and a stator;

wherein at least one of the rotor or the stator includes a bearing assembly comprising, a support ring;

a retention ring attached to the support ring, the retention ring including a plurality of through holes, each of the through holes exhibiting a lateral dimension that is greater proximate to the support ring; and a plurality of superhard bearing elements, each of the superhard bearing elements including a superhard bearing surface and a generally opposing base surface, each of the superhard bearing elements positioned in and extending from a corresponding through hole of the plurality of through holes, at least a number of the superhard bearing elements each including a shoulder, the shoulder of each of the at least a number of the superhard bearing elements disposed between the support ring and the retention ring and residing in the corresponding through hole, the shoulder of each of the at least a number of the superhard bearing elements configured to restrict displacement of a corresponding one of the at least a number of the superhad bearing elements through the corresponding through hole away from the support ring in a first direction, and the base surface of each of the at least a number of the superhard bearing elements positioned and configured to restrict displacement of the corresponding one of the at least a number of the superhad bearing elements through the corresponding through hole and toward the support ring in a second direction that is generally opposite the first direction.

21. A bearing assembly for use in a subterranean drilling system, the bearing assembly comprising:

a support ring;

a retention ring attached to the support ring, the retention ring including a plurality of through holes, each of the through holes exhibiting a lateral dimension that is greater proximate to the support ring; and a plurality of superhard bearing elements, each of the superhard bearing elements including a superhard bearing surface and a generally opposing base surface, each of the superhard bearing elements positioned in and extending from a corresponding through hole of the plurality of through holes, at least a number of the superhard bearing elements each including a shoulder, the shoulder of each of the at least a number of the superhard bearing elements disposed between the support ring and the retention ring and residing in the corresponding through hole, the shoulder of each of the at least a number of the superhard bearing elements restricting displacement thereof through the corresponding through hole away from the support ring during attempted movement in a first direction, and the base surface of each of the at least a number of the superhard bearing elements restricting displacement thereof through the corresponding through hole and toward the support ring during attempted movement in a second direction that is generally opposite the first direction by contacting the support ring.

* * * * *